United States Patent
West et al.

(10) Patent No.: US 10,873,288 B2
(45) Date of Patent: Dec. 22, 2020

(54) PIVOT-FIT FRAME, SYSTEM AND METHOD FOR PHOTOVOLTAIC MODULES

(71) Applicant: SolarCity Corporation, San Mateo, CA (US)

(72) Inventors: Jack Raymond West, San Rafael, CA (US); Tyrus Hawkes Hudson, Petaluma, CA (US)

(73) Assignee: SolarCity Corporation, San Mateo, CA (US)

( * ) Notice: Subject to any disclaimer, the term of this patent is extended or adjusted under 35 U.S.C. 154(b) by 230 days.

(21) Appl. No.: 15/457,713

(22) Filed: Mar. 13, 2017

(65) Prior Publication Data

US 2017/0187325 A1  Jun. 29, 2017

Related U.S. Application Data

(63) Continuation of application No. 14/504,168, filed on Oct. 1, 2014, now Pat. No. 9,599,280, which is a
(Continued)

(51) Int. Cl.
*H02S 20/23* (2014.01)
*F24S 25/20* (2018.01)
(Continued)

(52) U.S. Cl.
CPC .............. *H02S 20/23* (2014.12); *E04D 13/00* (2013.01); *F16M 13/02* (2013.01); *F24S 25/20* (2018.05);
(Continued)

(58) Field of Classification Search
CPC .. F24S 25/00; F24S 25/10; F24S 25/12; F24S 25/15; F24S 25/16; F24S 25/20; F24S 25/30; F24S 25/33; F24S 25/35; F24S 25/37; F24S 25/60; F24S 25/61; F24S 25/613; F24S 25/615; F24S 25/63; F24S 25/632; F24S 25/634; F24S 25/65; F24S 25/67; F24S 25/70; F24S 2025/019; F24S 2025/02; F24S 2025/6003; F24S 2025/6004; F24S 2025/6008; H02S 20/23; H02S 20/24; H02S 20/30; H02S 20/20
See application file for complete search history.

(56) References Cited

U.S. PATENT DOCUMENTS 4,371,139 A * 2/1983 Clark .................. F24S 20/67
                                                    248/237
7,814,899 B1 * 10/2010 Port .................... F24S 25/615
                                                    126/623
(Continued)

*Primary Examiner* — Jessica L Laux
(74) *Attorney, Agent, or Firm* — Dentons US LLP

(57) ABSTRACT

A system and apparatus are disclosed including PV modules having a frame allowing quick and easy assembling of the PV modules into a PV array in a sturdy and durable manner. In examples of the present technology, the PV modules may have a grooved frame where the groove is provided at an angle with respect to a planar surface of the modules. Various couplings may engage within the groove to assemble the PV modules into the PV array with a pivot-fit connection. Further examples of the present technology operate with PV modules having frames without grooves, or with PV modules where the frame is omitted altogether.

17 Claims, 17 Drawing Sheets

Related U.S. Application Data continuation of application No. 13/402,846, filed on Feb. 22, 2012, now abandoned, which is a continuation-in-part of application No. 12/830,249, filed on Jul. 2, 2010, now Pat. No. 8,919,052.

(60) Provisional application No. 61/445,042, filed on Feb. 22, 2011, provisional application No. 61/351,586, filed on Jun. 4, 2010, provisional application No. 61/255,004, filed on Oct. 26, 2009, provisional application No. 61/270,122, filed on Jul. 2, 2009.

(51) Int. Cl.
| | | |
|---|---|---|
| *F24S 25/61* | (2018.01) | |
| *F24S 25/613* | (2018.01) | |
| *F24S 25/67* | (2018.01) | |
| *F24S 25/70* | (2018.01) | |
| *H02S 20/00* | (2014.01) | |
| *H02S 20/24* | (2014.01) | |
| *F16M 13/02* | (2006.01) | |
| *E04D 13/00* | (2006.01) | |
| *H02S 30/00* | (2014.01) | |
| *F24S 25/00* | (2018.01) | |

(52) U.S. Cl.
CPC ............ *F24S 25/61* (2018.05); *F24S 25/613* (2018.05); *F24S 25/67* (2018.05); *F24S 25/70* (2018.05); *H02S 20/00* (2013.01); *H02S 20/24* (2014.12); *H02S 30/00* (2013.01); *F24S 2025/02* (2018.05); *Y02B 10/12* (2013.01); *Y02B 10/20* (2013.01); *Y02E 10/47* (2013.01)

(56) References Cited

U.S. PATENT DOCUMENTS

| | | | | |
|---|---|---|---|---|
| 8,104,239 | B2 * | 1/2012 | Fath | F24S 25/634 52/173.3 |
| 2003/0070368 | A1 * | 4/2003 | Shingleton | F24S 25/636 52/173.3 |
| 2008/0302407 | A1 * | 12/2008 | Kobayashi | H02S 20/23 136/251 |
| 2012/0273029 | A1 * | 11/2012 | Bragagna | F24S 25/13 136/251 |

\* cited by examiner

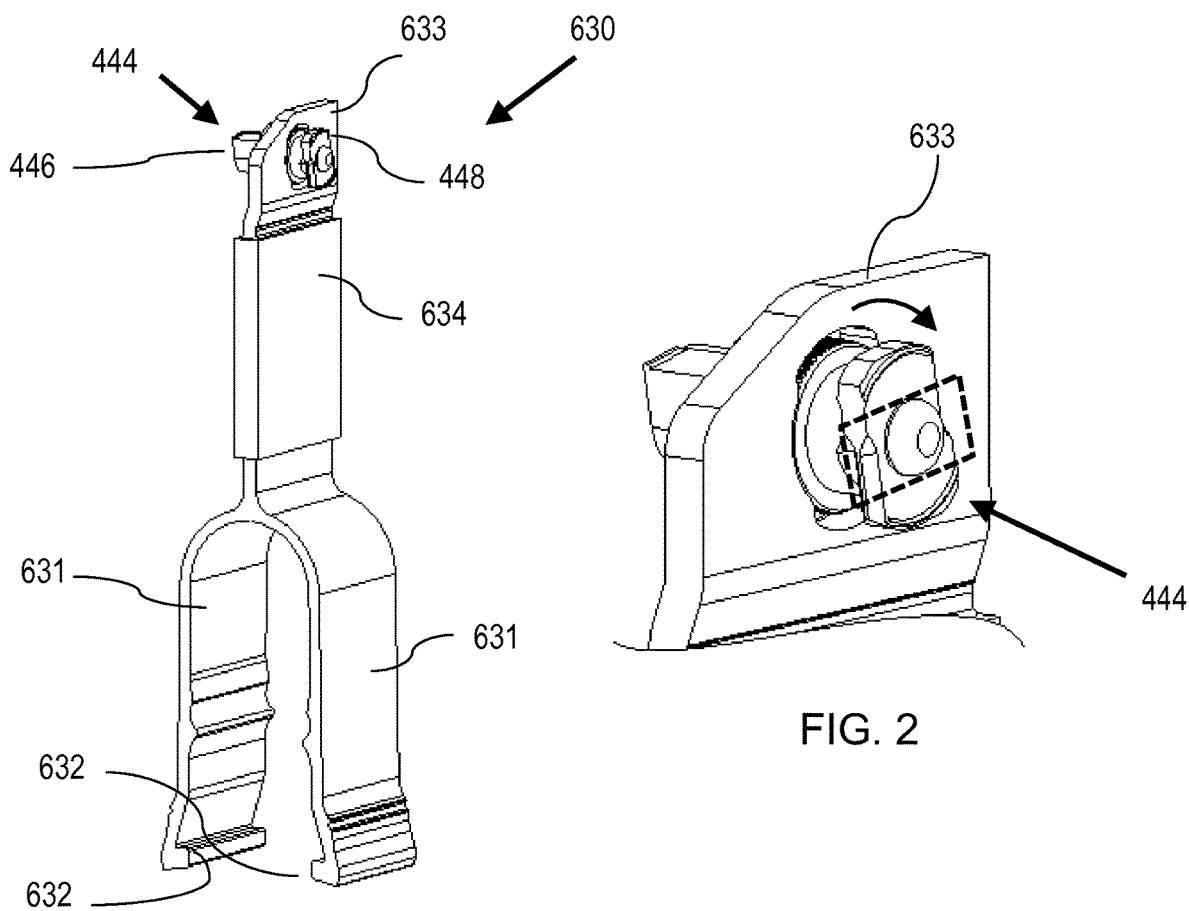
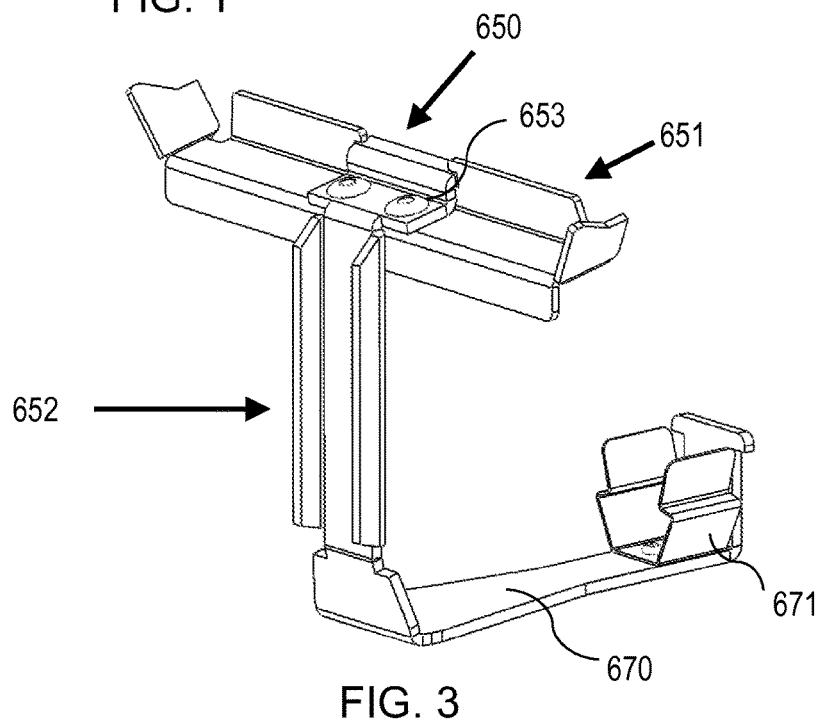

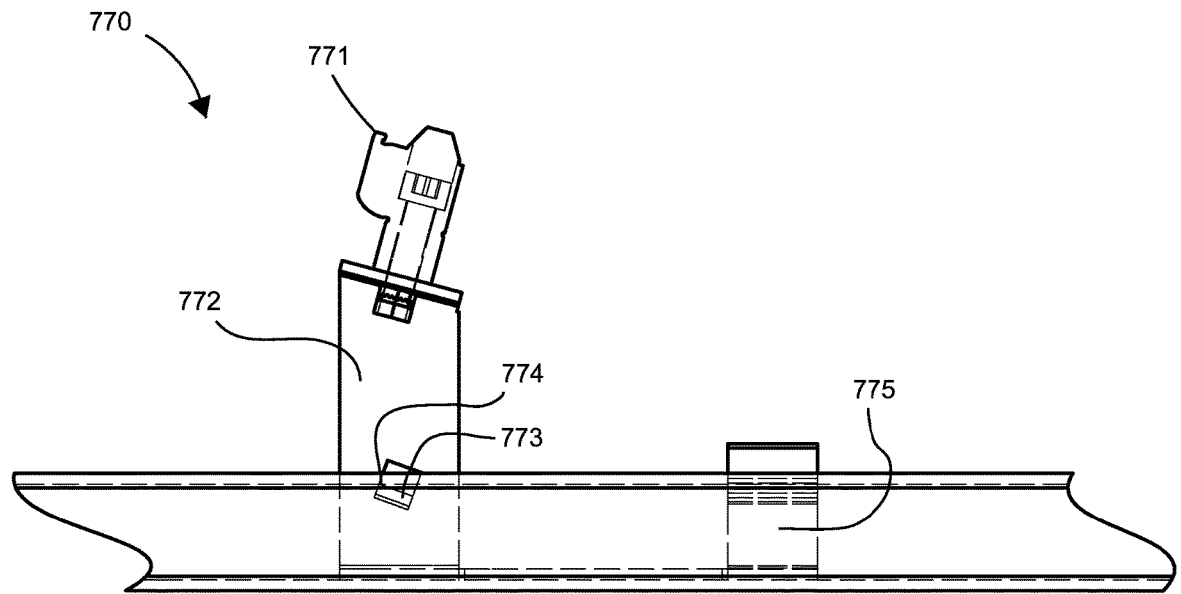
FIG. 15
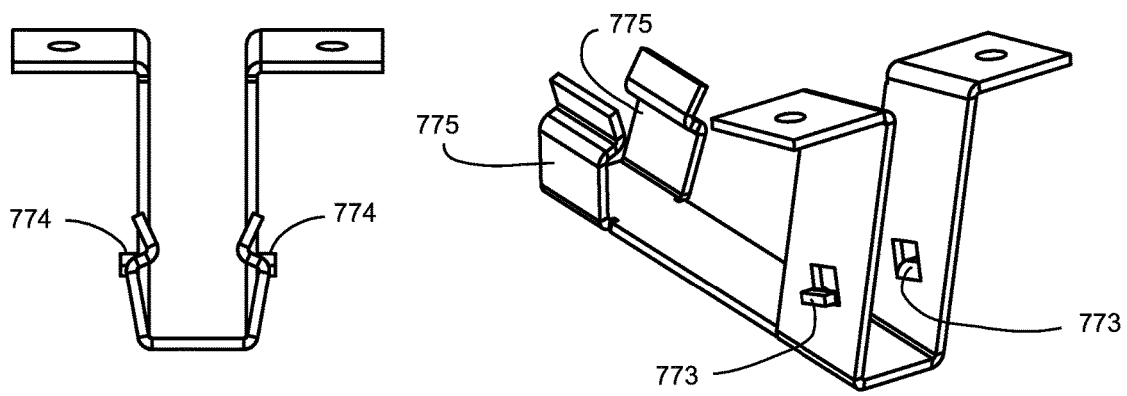
FIG. 16
FIG. 17

PIVOT-FIT FRAME, SYSTEM AND METHOD FOR PHOTOVOLTAIC MODULES

CROSS-REFERENCES TO RELATED APPLICATIONS

This application is a continuation of U.S. patent application Ser. No. 14/504,168, filed on Oct. 1, 2014, which is a continuation of U.S. patent application Ser. No. 13/402,846, filed on Feb. 22, 2012, which claims the benefit of U.S. Provisional Patent Application No. 61/445,042, filed on Feb. 22, 2011; and which is a continuation-in-part of U.S. patent application Ser. No. 12/830,249, filed on Jul. 2, 2010, now U.S. Pat. No. 8,919,052, issued on Dec. 30, 2014, which claims priority to U.S. Provisional Patent Application No. 61/351,586, filed on Jun. 4, 2010; U.S. Provisional Patent Application No. 61/255,004, filed on Oct. 26, 2009; and U.S. Provisional Patent Application No. 61/270,122, filed on Jul. 2, 2009. The foregoing applications are herein incorporated by reference in their entirety for all purposes.

Photovoltaic (PV) arrays are formed by mechanically linking together PV modules into an array. Most PV module coupling systems require the time-consuming use of multiple small fasteners. High part count and slow installation time is a major barrier to reducing PV system costs and adoption. Some attempts have been made to reduce fastener usage by developing press-fit and hook-type connections. However, these systems suffer from a number of drawbacks.

First, neither of these methods can adequately account for variations in the dimensions of PV modules and couplings due to manufacturing tolerances. PV modules typically vary by approximately ±0.1 0" along the length and/or width dimension. When multiple modules are formed into columns in the north-south direction of the PV array, it is critical that any dimensional variations from one module in the column not carry forward to the next module in the column, as the dimensional variations will add up over the length of the column and result in significant dimensional differences from one column to the next. Likewise, the same problem exists with east-west rows of PV modules. This problem, frequently referred to as tolerance take-up, is solved in rail-based systems by spacing the modules in a column more or less from each other on top of mounting rails so that the next module in the column is properly positioned and/or by only linking modules to the rails along one axis, either east-west or north-south. However, in rail-free systems, a PV module is structurally connected to the next module in both the north-south direction and the east-west direction. Thus, if the seams between adjacent east-west modules do not line up because of compounded north-south dimensional variations, then it may be impossible to complete the installation of an array. In other systems compounded east-west variations may cause problems along the north-south axis. Press-fit and hook-type connections do not adequately address or solve the problem of tolerance variations.

Second, press-fit and hook-type connections do not provide a reliable electrical ground bond between adjacent PV modules. Hook-type connections are inherently loose-fitting and thus incapable of providing a consistent, low-resistance ground bond that will withstand weather conditions over time. Similarly, a press-fit connection does not provide a reliable ground bond unless the materials are deformed enough in the connection. In practice, too much force is required to achieve such deformation with standard PV module frame materials such as aluminum, thereby eliminating any time and cost savings that might have occurred since a heavy-duty tool would be required to deliver the force needed for the deformation.

Third, press-fit and hook-type systems cannot reliably provide a strong, durable connection between mating male and female parts. In order to facilitate a quick and easy connection, the female receiving portion in the connection is made wider than the male connecting portion. This results in a loose or unstable connection, which is vulnerable to loosening over time as the PV modules experience mechanical stress due to wind and snow loads.

It is also important to note that PV mounting systems require a design that works with a wide tolerance band. The reason is that production of tight tolerance PV modules and couplings is very expensive. In order to accelerate the adoption of solar power, it is necessary to reduce the cost of solar arrays, thus increased costs for tight tolerance parts is not a viable option in the market.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

Disclosed herein is a system and method for quickly and easily assembling PV modules into a PV array in a sturdy and durable manner. In some embodiments, the PV modules may have a grooved frame where the groove is angled into the frame with respect to the planar surface of the modules. Various components may engage within the angled groove to assemble the PV modules into the PV array using what may be referred to as a pivot-fit connection between the components and angled groove. One type of component is a leveling foot which in some embodiments includes a foot mounted to a support surface and a coupling affixed to the foot. The coupling of the leveling foot may have a male component such as a tongue for coupling within the groove. In order to mount a PV module to the leveling foot, the module is seated on the tongue and rotated down until the angle of the groove substantially aligns with the axis of the tongue. The groove may then seat at least partially over the tongue. To complete the pivot-fit connection, the PV module is simply pivoted down to its final angular orientation in the PV array. This final rotation causes bearing portions in the groove to bear against the tongue to restrain the PV module against upward or downward movement. The coupling may still allow for adjustment of the PV module position in the plane of the PV array to account for tolerance variations.

Another type of coupling is an interlock having an interlock plate and a pair of couplings, each having a key supported on a shaft. The interlock may be affixed into the groove of a pair of adjacent modules with the angle of the key and shaft substantially matching the angle of the groove. Thereafter, rotation of the key and shaft pivots the interlock into the grooves of the adjacent PV modules, thereby affixing the adjacent modules together. This final rotation causes bearing portions in the groove to bear against the interlock plate to resist upward or downward movement of the coupled PV modules. The coupling may still allow for adjustment of the PV module position in the plane of the PV array to account for tolerance variations.

Further embodiments of the present technology may operate with PV modules having frames without the angled grooves. For such embodiments, wraparound brackets are used which engage the upper and lower surfaces of the module frame, or the PV laminate itself in some embodiments where the frame is omitted. In such embodiments, the wraparound component may have frame-engaging or laminate-engaging couplings provided at an angle as in the angled groove of the above embodiments. The PV modules may initially engage with the wraparound components substantially at the angle of the couplings, and thereafter be pivoted down to their final position relative to the coupling. As in the grooved frame embodiments, this final rotation causes bearing portions in the wraparound coupling to bear against the PV module frame to restrain the PV module in position in the array.

An embodiment of the present technology relates to a photovoltaic module, the photovoltaic module being adapted for connection to an adjacent photovoltaic module by a coupling. The photovoltaic module includes: a photovoltaic laminate; and a frame, said frame adapted to provide support for said laminate and comprising a connection portion adapted to receive said coupling at an insertion angle greater than 2 degrees relative to a plane of said photovoltaic module.

A further embodiment relates to a frame for a photovoltaic module adapted for connection to an adjacent photovoltaic module frame by a coupling. The frame includes a connection portion comprising an upper bearing portion adapted to transfer a portion of a downward force on said photovoltaic module to at least a portion of said coupling; wherein said connection portion is adapted to pivotally receive at least a portion of said coupling.

Another embodiment relates to a photovoltaic module having a frame adapted for connection to an adjacent photovoltaic module by a coupling and defining a reference plane when connected to the adjacent photovoltaic module. The module includes a first bearing portion; and a second bearing portion; wherein said module is adapted to pivotally engage with said coupling at a position along a length of said frame, said length being substantially parallel with said reference plane, said second bearing portion offset from said first bearing portion in a direction substantially parallel to said reference plane and perpendicular to said length, said first and second bearing portions adapted to allow variable positioning of said photovoltaic module relative to said adjacent photovoltaic module in a direction substantially parallel with said reference plane and perpendicular to said length.

A further embodiment relates to a frame for a photovoltaic module, the photovoltaic module being adapted for connection to an adjacent photovoltaic module by a coupling. The frame includes: a connection portion; a first bearing portion; and a second bearing portion; wherein said first and second bearing portions are at least partially located within said connection portion, said frame adapted to pivotally engage with said coupling.

In addition to the exemplary aspects and embodiments described above, further aspects and embodiments will become apparent by reference to the figures and by study of the following detailed descriptions.

BRIEF DESCRIPTION OF THE DRAWINGS

Demonstrative embodiments are illustrated in referenced figures and drawings. It is intended that the embodiments and figures disclosed herein are to be considered illustrative rather than restrictive.

FIG. 1 is a perspective view of a coupling leg according to an embodiment of the present technology.

FIG. 2 is a perspective close-up view of a portion of a coupling leg, such as shown in FIG. 1, inserted through a plate, illustrating an ability to rotate a coupling.

FIG. 3 is a perspective view of a support coupling according to an embodiment of the present technology.

FIG. 15 is a side view of a tilt foot engaged with a rail.

FIG. 16 is an end view of a tilt foot.

FIG. 17 is a perspective view of a tilt foot.

DETAILED DESCRIPTION OF THE INVENTION

Figure 4:
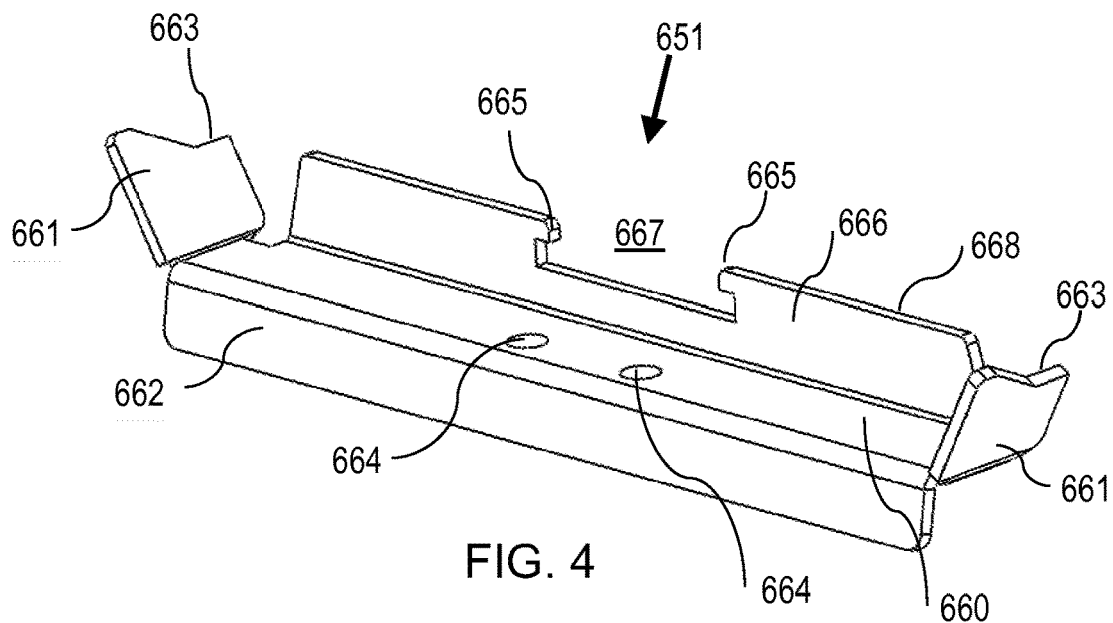
FIG. 4 is a perspective view of an interlock, which may be attached to a foot base, 20 such as shown in FIG. 3.

While various terms may have their ordinary meaning or particular meaning in the art, for ease of understanding there is provided herein, both below and at other locations in this specification, a non-limiting explanation as to the minimum scope intended for understanding of the present specification. Terms may be in singular or plural or any tense while retaining the same general meaning.

Arm refers to a relatively narrow device, item, feature or portion of an item that extends, branches or juts-out from a mass or other part; also a slender part of a structure, machine, instrument or apparatus that projects from a main part, axis, pivot or fulcrum. For example, an arm may be may be exemplified by foot 670 of rocking foot 652 in FIG. 6 and its descriptions.

Ballast refers to a heavy device, item, feature or portion of an item that provides stability or weight to make an object steadfast. For example, ballast blocks 751 on a ballast pan 750 of a structural system may be exemplified in FIG. 13 and its descriptions. For another example, ballast stone 864 on tilt interlock 860 may be exemplified in Figure 86 and its descriptions.

Bracket refers to a simple structure with an elongate structure, sometimes in the general shape of an L or an I or a C, and frequently comprising a plate or sheet-type construction with one dimension typically thinner than the others in a given plate-like portion of the object. A Bracket is often an overhanging member that projects from a structure (such as a portion of a wall or frame) and may be designed to support a load with a vertical component, such as a skirt. A bracket may also refer to a fixture projecting from a wall, column, frame or the like which may be used for holding, securing, positioning or supporting another object. For example, a bracket for mounting a photovoltaic (PV) module is exemplified as coupling leg 630 in FIG. 1, tilt foot 650 in FIGS. 3-6, slide-in foot 730 and 740 in FIGS. 11-12, and tilt foot 770, 800 and 820 in FIGS. 15, 18 and 20 and their descriptions.

Channel refers to a device, item, feature or portion of an item that refers to a long, narrow cut, rut, indentation, channel, female portion, trench, furrow, gutter, slot or depression often used to guide motion or receive a corresponding male portion, ridge or tongue. An example channel 697 in a rail 690 of a structural system is exemplified in FIGS. 7-10, and their descriptions.

Connect, Connected and Connecting refers to bringing together or into contact with or joining or fastening to form a link or association between two or more items, mechanisms, objects, things, structures or the like. For example, a bracket such as interlock 651 connected to a PV module 102 may be exemplified in FIG. 68, and its descriptions. For an additional example, a bracket clip 671 connected to rail 690 may be exemplified in FIGS. 8-10, and their descriptions. For yet another example, a tilt foot 650 connected to rail 690 may be exemplified in FIG. 6, and its descriptions.

Connector refers to an object, item, mechanism, apparatus, combination, feature, link or the like that links, joins, unites or fastens two or more things together. The term connector may also include a device, an object, item, mechanism, apparatus, combination, feature, link or the like for keeping two parts of an electric or electronic circuit in contact. For example, a connector for connecting or coupling a plate 633 to spring legs 631 may be exemplified at sleeve 634 in FIG. 1 and its descriptions.

Couple refers to joining, linking, connecting or mating two or more objects or items, mechanisms, objects, things, structures or the like together. For example, interlock 937 comprises box section 934 coupled with catch plate 932 and ground clips 933 which may engage with a groove 114 in a PV module 102, as exemplified in FIGS. 31-33, and their descriptions.

Coupling refers to an object, item, mechanism, apparatus, combination, feature, link or the like that joins, links, mates or connects two things together. For example, a coupling leg 630 may couple to a rail 690 and it may further couple two PV modules 102 together, as exemplified in FIGS. 1, 25, 27-30, and their descriptions.

Disengage refers to detaching, freeing, loosening, extricating, separating or releasing from something that holds-fast, connects, couples or entangles. See Engage below.

Engage refers to contacting, interlocking or meshing one or more items, mechanisms, objects, things, structures or the like. See Disengage above. For example, coupling legs 630 engage rail 690 as may be exemplified in FIGS. 1, 7, 27-30 and their descriptions. For another example, interlock 651 engages a groove in a PV module as may be exemplified in FIG. 4 and its descriptions.

Mounting refers to an object, item, mechanism, apparatus, combination, feature, link or the like that serves as a support, attachment, setting or backing; or serves to fix an object or the like securely to a support.

Ground bond as used herein refers to grounding and/or bonding. Bonding refers to the essentially permanent joining of metallic parts together to form an electrically conductive path; such path must have the capacity to conduct safely any fault current likely to be imposed on it. Grounding refers to electrical connection to earth or the bonding together of metal objects so that they may be connected to earth.

Length refers to the measurement or extent of an object, item, mechanism, apparatus, combination, feature, link or the like from end to end, usually along the greater or longer of the two or three dimensions of the body; in distinction from breadth or width.

Lock, Locking or Locked refers to fastened, connected, secured or interlocked, such that a certain level of force or movement of an engaged portion is required to unlock the locked objects.

Pivot, Pivotally and Pivoting refers to or relates to an object, item, mechanism, apparatus, combination, feature, link or the like serving as a pivot or the central point, pin, shaft or contact region on which another object, item, mechanism, apparatus, combination, feature, link or the like turns, swings, rocks, rotates or oscillates. An example pivoting mechanism, rocking foot 652, that creates a pivot-fit connection to a rail 690 is exemplified in FIGS. 8-10 and its descriptions.

Positionable refers to an object, item, mechanism, apparatus, combination, feature, link or the like which is capable of being positioned, placed or arranged in a particular place or way.

PV array or photovoltaic array refers to a plurality of photovoltaic modules connected together often in a pattern of rows and columns with module sides placed close to or touching other modules, and sometimes including rows tilted relative to a flat surface beneath.

PV module or photovoltaic module (sometimes referred to as a solar panel or photovoltaic panel) refers to a packaged interconnected assembly of solar cells, also known as photovoltaic cells. A plurality of PV modules are commonly used to form a larger photovoltaic system referred to as a PV array, to provide electricity for commercial, industrial and residential applications.

Rail refers to refers to a relatively straight, usually essentially evenly shaped along its length, rod, beam, girder, profile or structural member or the like, or plurality of such, of essentially rigid material used as a fastener, support, barrier, or structural or mechanical member.

Rock, Rocking, Rocked and Rocks refers to an object, item, mechanism, apparatus, combination, feature, link or the like which moves to and fro, back and forth or side to side, frequently along a curved path of motion. The point, line or surface for rocking may be a fixed pivot point or line, or may be a curved surface of one, multiple or varying radius (radii). For example, a rocking bracket 652 is exemplified in FIGS. 6 and 8-10, and its descriptions. For another example, an arm, such as foot 670, which is operable to rock a bracket is exemplified in FIG. 6, and its descriptions. For yet another example, a rocking surface 6712 is exemplified in FIGS. 6 and 8-10.

Rotate or rotatably refers to one or more items, mechanisms, objects, things, structures or the like which are capable of being rotated, revolved or turned around or about an axis or center.

Spring clip refers to an object, item, mechanism, apparatus, combination, feature, link or the like which is usually made from a deformable material that expands to fit (a) over a shaft, rod, arm, rail or other structure, or (b) into a hole, channel (see Channel above), or the like capable of gripping or holding under spring pressure. One common form is a press fit spring clip where the resilient or springy structure as assembled or inserted into a matching hole or channel with a slightly smaller internal dimension through the use of force.

Structural system refers to one or more objects, items, mechanisms, apparatus, combinations, features, link or the like, such as rails, braces, brackets, headers, feet, splices, connectors and other connecting devices or structures, which may be placed generally between a support structure and a PV module; structural system may also include the support structure.

Support or supporting refers to one or more items, mechanisms, objects, things, structures or the like which are capable of bearing weight or other force, often to keep the item or the like from falling, sinking, slipping or otherwise moving out of a position.

Support structure refers to a structure, such as a roof, rack, table, building, or the ground which may provide a base for securing PV modules to form a PV array.

FIG. 1 shows a further embodiment of a mounting bracket or leg, such as a pivot leg or coupling leg, for example coupling leg 630. Coupling leg 630 may include a lower portion, for engaging a substructure such as a channel on a rail or other structure, such as rail 690 (which is described in more detail with respect to FIG. 7 and others), which may be comprised of flexible vertical walls or legs, such as spring legs 631. Spring legs 631 may include locking tabs or protrusions, such as tabs 632. Coupling leg 630 may engage rail 690 as by pushing coupling leg 630 downward onto (or in alternative embodiments, into) rail 690, as described in more detail below, especially in reference to FIGS. 7 and 27 through 30, such that spring legs 631 may engage angled walls 691. Due to the lead-in angle of angled walls 691, spring legs 631 engage and may slide on angled walls 691. As spring legs 631 slide downward, spring legs 631 may be forced apart until tabs 632 slide past lips 694, at which point spring legs 631 may be able to move towards each other, thereby causing tabs 632 to be engaged against lips 694 and angled surfaces 692. The engagement between tabs 632 and lips 694 may prevent coupling leg 630 from being pulled up or off of rail 690. Furthermore, angled surfaces 692 may engage with tabs 632 so that when spring legs 631 are pushed down with sufficient force, spring legs 631 are forced open until tabs 632 contact catches 693. Coupling leg 630 further may include an upper portion, for engaging a groove of a PV module 102, which may be comprised of a plate, or bracket, such as plate 633, which may contain one or more holes or similar feature for receiving a coupling device, such as coupling 444 as further described in previously incorporated U.S. patent application Ser. No. 14/504,168, which may have a tongue 446 and key 448 extending from opposite sides of plate 633. Plate 633 and spring legs 631 may be comprised of a single piece of material, or may be separate pieces joined, as by a splice, or other connector, such as sleeve 634, or may be attached to each other as by one or more rivets, pins, screws, welds or the like. The body of coupling 444 may be engaged with plate 633 as by swaging to create a tight and essentially permanent fit that may not be easily altered, or coupling 444 may be press-fit into plate 633 such that the coupling 444 may be rotationally moved relative to plate 633, as shown in FIG. 2 where dotted lines show final position. In the present embodiment, coupling 444 may be permanently set in plate 633 at an angle, such as 11 degrees off of vertical (commonly between 5 and 45 degrees), which corresponds to the desired final tilt angle of a PV module, as will be described below.

FIGS. 3-6 show a further support coupling in the form of a tilt foot 650, or similar bracket/leg, such as comprising a foot 670 for attaching a PV module to a structural system, ballast holder, channel, rail (similar to rails 236 in FIG. 38 of previously incorporated U.S. patent application Ser. No. 14/504,168), or the like, such as rail 690. In some embodiments foot 670 may comprise an alternative embodiment of an interlock (similar to interlock 106 in FIG. 14 of previously incorporated U.S. patent application Ser. No. 14/504,168) or a different embodiment, such as interlock 651, and a support foot, leg, bracket, or the like, such as rocking foot 652. Interlock 651 may be attached to rocking foot 652 as by one or more rivets, pins, screws, welds or the like, such as rivets 653. In other embodiments, interlock 651 and foot 670 are different portions of a single piece of material, and therefore no rivets are necessary in such embodiments. In some embodiments, foot 670 has a clip 671 integral with or attached, as shown in FIG. 65.

Referring now to FIG. 4, interlock 651 provides an alternative means, including apparatus and method, to engage with a groove or the like in a PV module, similar to groove 114 in PV module 102 in FIG. 3 of previously incorporated U.S. patent application Ser. No. 14/504,168, as will be shown in more detail below, especially in reference to FIG. 4. In other embodiments interlock 651 may wrap around a PV module frame, such as shown in FIGS. 29-36 of previously incorporated U.S. patent application Ser. No. 14/504,168. Turning now with particularity to FIG. 4, interlock 651 may comprise a plate, bracket, or the like, such as interlock plate 660 made of bent steel or other suitable material (such as aluminum or other metal or plastic), with features to engage and pivot-fit into groove 114 in a manner similar to tongue 148 (see, for example, FIGS. 11-13A of previously incorporated U.S. patent application Ser. No.

14/504,168), tongue 476 (see, for example, FIG. 51 of previously incorporated U.S. patent application Ser. No. 14/504,168), and ribs 170 (see, for example, FIGS. 17-23 of previously incorporated U.S. patent application Ser. No. 14/504,168) except that the exact shape(s) of the pivot-fit portions may vary slightly. Pivot-fit portions of interlock 651 may include flanges, lips, tabs, walls, or the like, such as angled flanges 661. Interlock 651 may be made of sheet material of a thickness such as 2.5 mm, usually between 1.0 and 5.0 mm. Angled flanges 661 may be bent at an angle, such as 75 degrees, usually between 61 and 89 degrees, which may create sharp cutting edges, teeth, or the like, such as cutting edges 663, on each (or at least on many, and preferably on most) angled flanges 661. As will be discussed in more detail with reference to FIG. 26 below, angled flanges 661 may comprise a height that enables at least partial insertion into a groove 114 when PV module 102 is positioned at an insertion angle relative to interlock 651. In the instant embodiment, since a final plane of PV module 102 relative to a roof surface may be tilted to an array tilt angle, for example from 3-50°, this insertion angle may be equal to the angle required to allow angled flanges 661 to at least partially insert into grooves 114 (on a pair of adjacent PV modules 102) plus the array tilt angle. Subsequent rotation of PV modules 102 from the insertion angle to the array tilt angle may cause a pivot-fit action between upper and lower portions of angled flanges 661 and offset bearing surfaces 124, 128 within grooves 114 as described with respect to other embodiments above. In some embodiments rotation to the array tilt angle may further cause cutting edges 663 to cut and/or deform portions of frame 112 thereby serving to take up tolerance and/or provide a ground bond connection between interlock 651 and frame 112. In the present embodiment, flange 662 provides stiffness to interlock 651, but it may be appreciated that flange 662 may be omitted, such as if greater stiffness is not required. As seen more clearly on FIG. 4, vertical wall 666 may contain a catching surface, or edge, such as catch 668, and a gap, void, or cutout, such as gap 667. Catch 668 may be used to engage with a slot or other feature within a groove of a PV module frame or on a surface of a PV module frame. Gap 667 is shown here with tabs, protrusions, or extensions, such as tabs 665 for at least partially retaining a portion of rocking foot 652, but alternate variations are explicitly contemplated. In the present embodiment, attachment holes 664 may be used to attach interlock 651 to other supporting members or brackets, such as rocking foot 652, as shown in FIG. 3. It may be appreciated that interlock 651 may be attached to many embodiments of structural systems and/or foot brackets and by many different means, such as one or more rivets, screws, pins, bolts and nuts, welds, clips, and the like.

Figure 5:
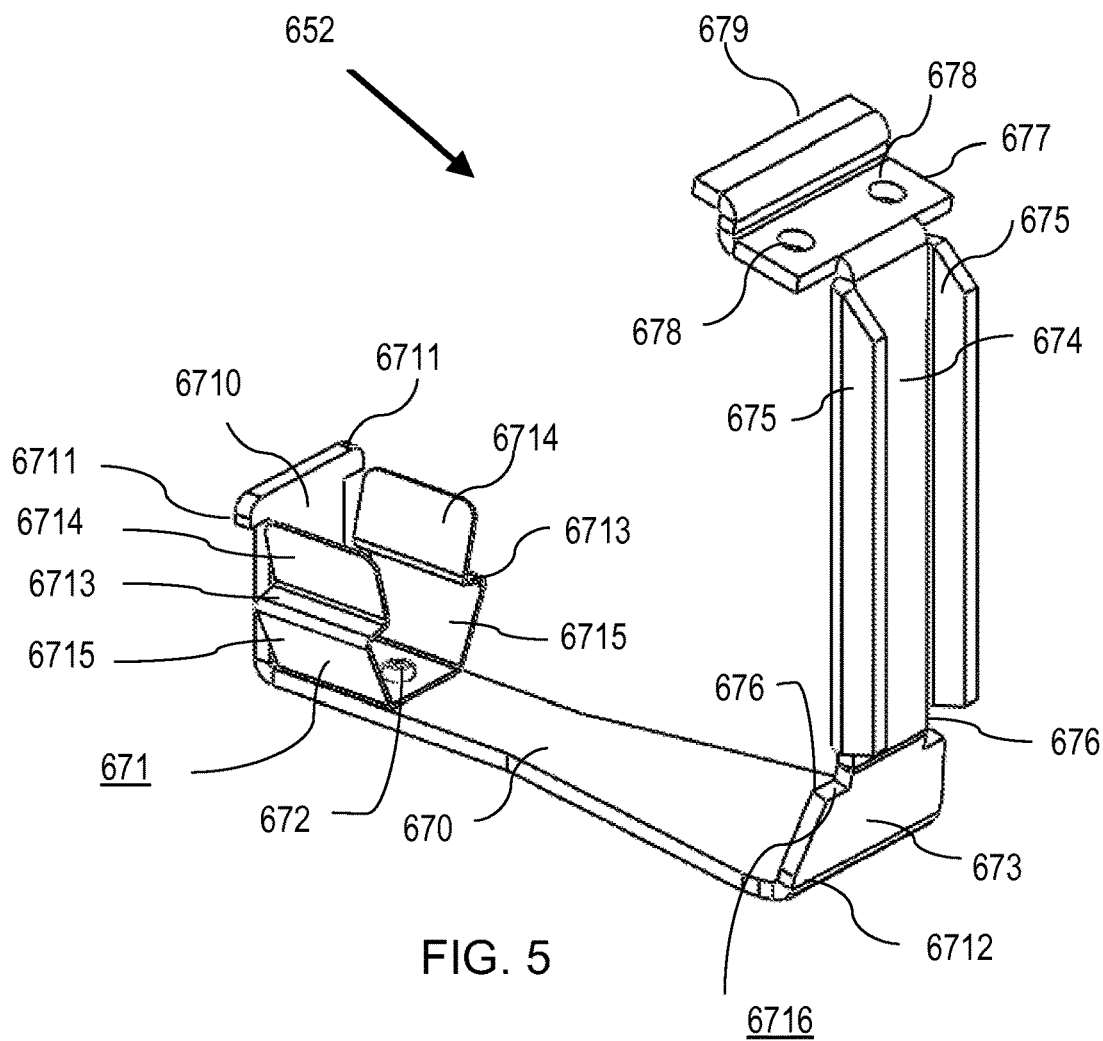
FIG. 5 is a perspective view of a foot base, which may be attached to a tilt interlock, such as shown in FIG. 3.

Referring now to FIG. 5, rocking foot 652 may be comprised of a foot, leg, support, or the like, such as foot 670, and a retainer, spring, clip or the like, which may be made from a resilient material, such as clip 671. In some embodiments foot 670 may perform the function of a lever arm that rocks rocking foot 652 into engagement. A more detailed description of the structure, use, purpose and function of rocking foot 652 will be described below, especially in reference to FIGS. 8-10. Clip 671 may be attached to foot 670, as by one or more rivets, pins, screws, welds or the like, such as rivets 672. Clip 671 may be made of a resilient or spring material, such as spring steel, plastic, rubber or other resilient material, and may include angled ramps or walls, such as angled walls 6715. Clip 671 further may include support surfaces, or stopping surfaces, such as stopping surfaces 6713 and stopping tabs 6714.

Referring to FIG. 5, foot 670 may be made of sheet steel, or other suitable metal, plastic or similar material, of a thickness such as 4 mm, usually between 2.0 and 8.0 mm. Foot 670 may include a vertical support section composed of an angled flange or tab, such as angled tab 673, a vertical riser or wall, such as riser 674, which may or may not include stiffening walls, tabs, or flanges, such as flanges 675. Angled tab 673 may be bent at an angle, such as 75 degrees, usually between 61 and 89 degrees, which creates metal deforming edges, sharp cutting edges, teeth, or the like, such as deforming edges 676. In other embodiments deforming edges 676 may be formed by means other than angled tab 673, such as by attaching separate deforming members, cutting teeth, sharp objects, or the like to rocking foot 652. Deforming edges 676 together are referred to as engaging portion 6716 of rocking foot 652. In other embodiments engaging portion 6716 may comprise one or many deforming edges 676. The bend that creates angled tab 673 may also create a pivot point, pivot line, rocking surface, or pivot surface, such as rocking surface 6712. Rocking surface 6712 and deforming edges 676 may be used to positively engage with a support surface, ballast holder, rail, or channel, such as rail 690, as will be further described below. Riser 674 extends to a desired height, and may terminate at an additional angled flange or tab, such as angled tab 677. Angled tab 677 may contain several attachment holes, such as holes 678, for attaching additional components, such as an interlock 651, as by rivets 653 in FIG. 1. Angled tab 677 extends to an edge, termination or surface, such as stopping surface 679, the purpose of which is further described below, especially in reference to FIG. 6. As will be discussed in more detail below, foot 670 may contain a vertical wall, tab, flange, or the like, such as tab 6710, with wings, tabs, or the like, such as wings 6711.

Figure 6:
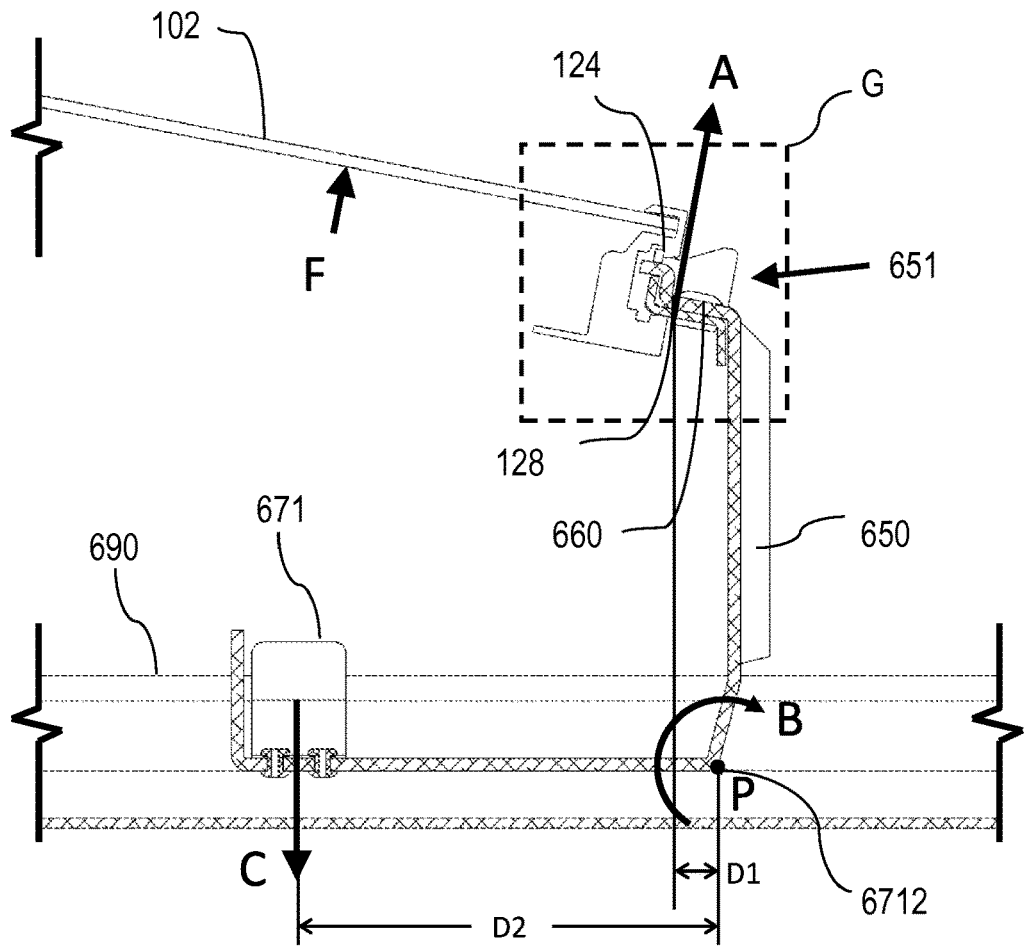
FIG. 6 is a side view of a support coupling, such as shown in FIG. 3, installed into a PV module.
Figure 6A:
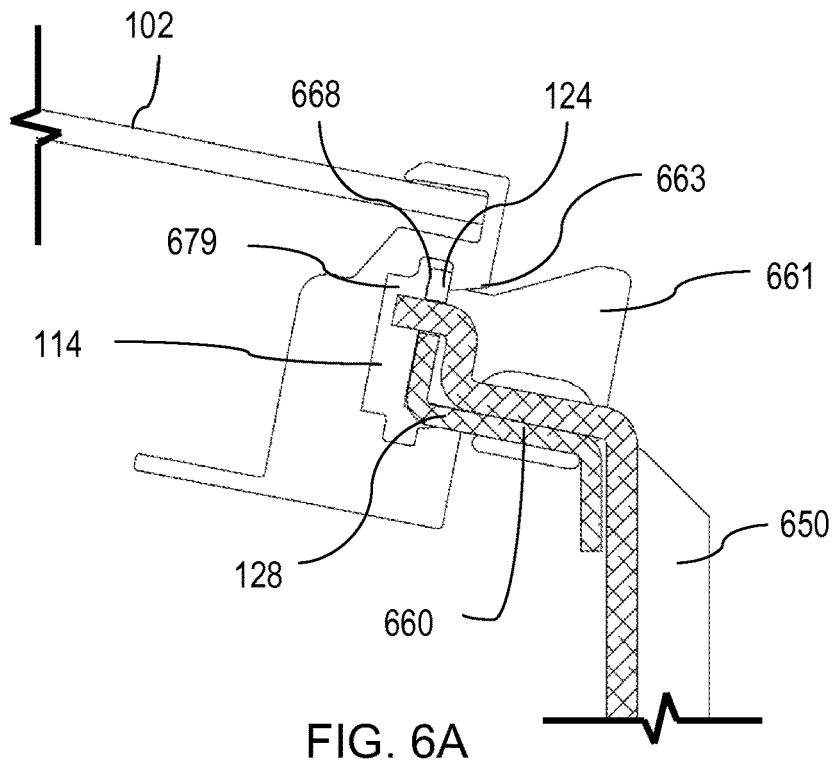
FIG. 6A is a close-up view of FIG. 6 at box G.

Referring now to FIG. 6, interlock 651 is shown as engaged or connected with groove 114 in a PV module, such as PV module 102. Angled flanges 661 may be bent such that the distance from cutting edges 663 to the bottom of interlock plate 660 is greater than the distance between bearing surfaces 124 and 128, as shown by distance "n" in FIG. 4 of previously incorporated U.S. patent application Ser. No. 14/504,168. It is understood that interlock 651 may be made of alternative thicknesses and materials, and that angled flanges 661 may be bent at angles other than 75 degrees, although usually between 61 and 89 degrees, while maintaining a distance between cutting edges 663 and the bottom of interlock plate 660 that is greater than "n", as illustrated in FIG. 4 of previously incorporated U.S. patent application Ser. No. 14/504,168. Stopping surface 679 may prevent interlock 651 from entering groove 114 too far. Catch 668 as shown protrudes above cutting edges 663 into upper recess 130a (see, e.g., FIG. 4 of previously incorporated U.S. patent application Ser. No. 14/504,168) of groove 114. Catch 668 may serve to prevent interlock 651 from pulling out of groove 114, and creates a point of leverage to aid insertion of interlock 651 into groove 114.

Figure 7:
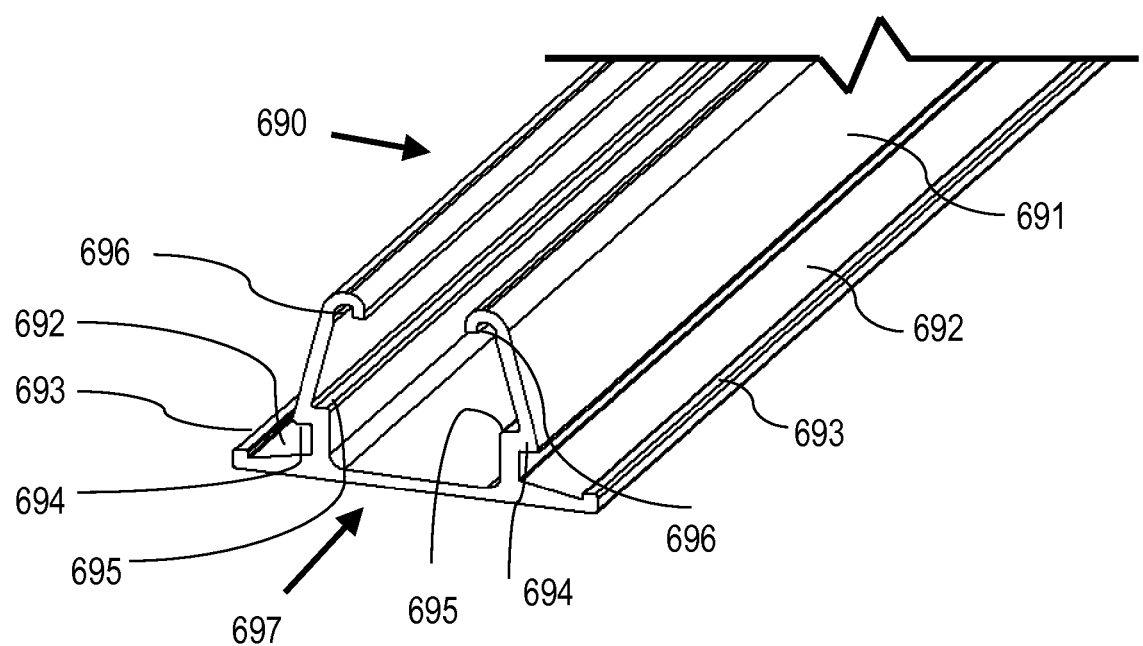
FIG. 7 is a perspective view of a support rail with a channel.

FIG. 7 shows a perspective view of rail 690. Rail 690 may include one or more of a number of features to engage with support brackets, feet, legs, and the like, such as foot 670, with other embodiments as will be described below. In the present embodiment, rail 690 may include a channel 697 running partially or essentially throughout the length of rail 690, as well as inwardly angled walls, or surfaces, such as angled walls 691. Rail 690 may also include downwardly angled surfaces, such as angled surfaces 692. Further features may include short vertical walls, stopping surfaces, or catches, such as catches 693, and horizontal walls, stopping surfaces, or lips, such as lips 694. Rail 690 may further include horizontal walls, or support surfaces, such as support surfaces 695. Further features may include downward facing surfaces, or tabs, such as stopping lips 696.

Figure 8:
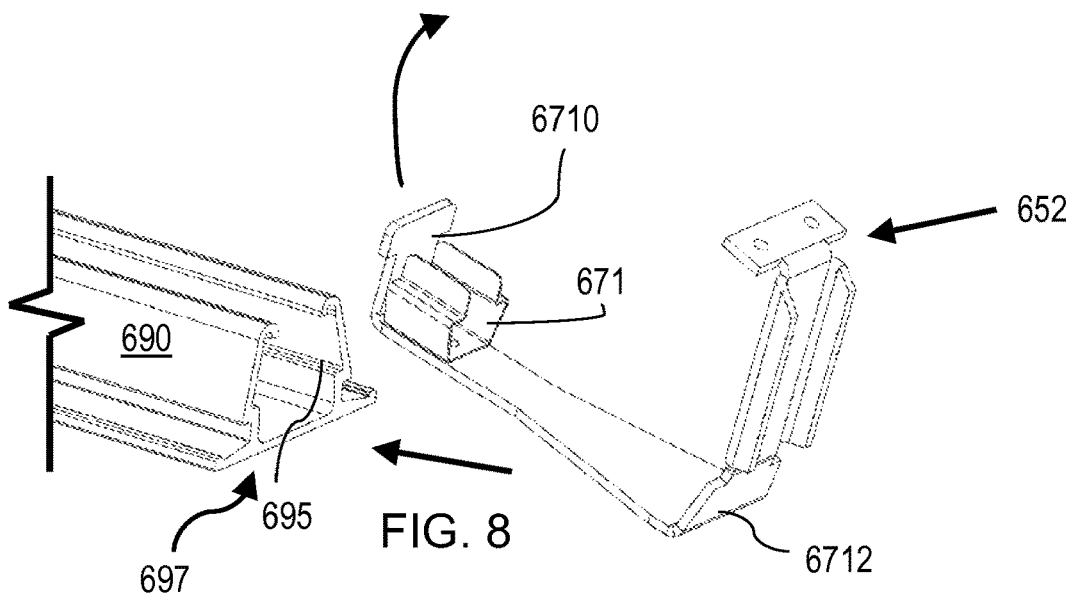
FIGS. 8-10 are perspective views representing a sequence of actions used to install a foot base in a channel of a rail.
Figure 9:
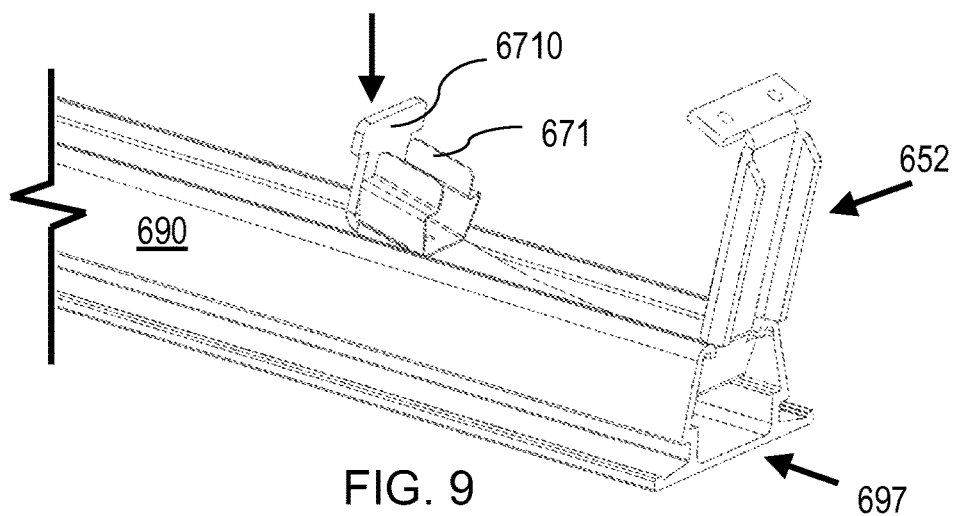
Figure 10:
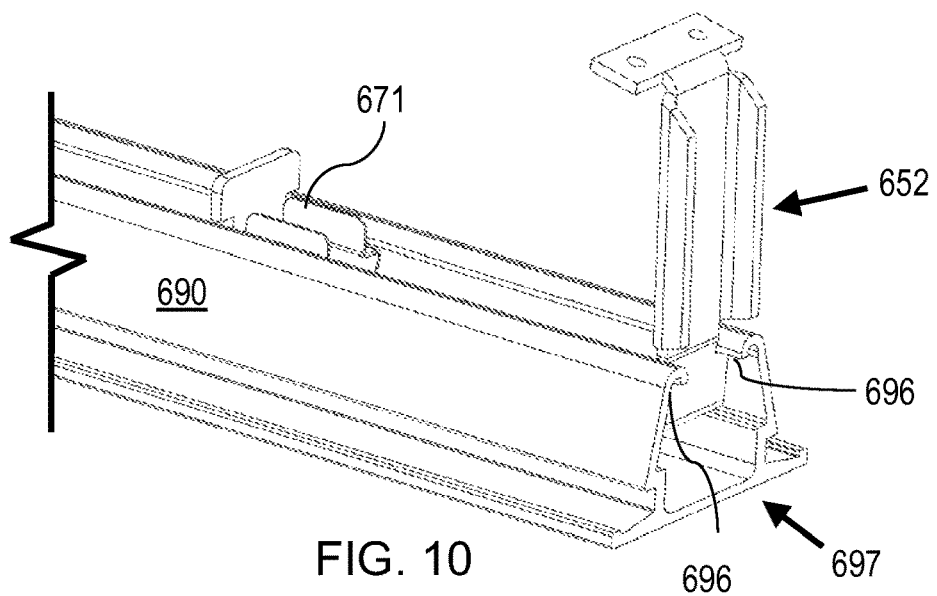

Referring now to FIGS. 8-10, the installation of rocking foot 652 into rail 690 is described. FIG. 8 shows rocking foot 652 tilted to an insertion angle such that tab 6710 may be above rail 690, and rocking surface 6712 may be approximately even with support surfaces 695. It is expressly contemplated that the insertion angle may be from approximately 1 to 45 degrees, but usually between 20 to 35 degrees, relative to a final angle as discussed below. Rocking foot 652 may be inserted in the direction shown by arrow on FIG. 8, to reach a position inside the channel 697 of rail 690 such that a substantial portion, even a majority or even the entire length of rocking foot 652 may be inside the rail, as shown in FIG. 9. Next, a downward force may be applied, for example by the foot of an installer, to the top of tab 6710 as shown by arrow on FIG. 9. The downward force causes rocking foot 652 to pivot or rock about rocking surface 6712. As tab 6710 is pressed downward, angled walls 6715 of clip 671 may be forced together until rocking foot 652 rocks to a final angle where stopping surfaces 6713 are below stopping lips 696 on rail 690. As rocking foot approaches the final angle, engaging portion 6716 may begin to engage with stopping lips 696. This engagement action may cause deforming edges 676 to deform, pierce, or cut stopping lips 696 thereby creating a more robust mechanical, and in some embodiments electrical ground bond, connection between rocking foot 652 and a structural system such as rail 690. As clip 671 may be made of a resilient or spring material, angled walls 6715 may open to approximately their original angle, thereby engaging stopping surfaces 6713 against stopping lips 696 to effectively connect clip 671 to rail 690 and providing resistance to rotation in the direction from the final angle back toward the insertion angle. One of skill in the art will recognize that rocking foot 652 is thus connected to rail 690 by a pivot-fit action whereby the offset bearing points (deforming edges and 676 rocking surface 6712) at each end of angled tab 673 are rocked or pivoted by a lever arm, such as foot 670, until a tight fit is realized, then the fit is maintained by the engagement of spring clip 671. Stopping tabs 6714 may prevent clip 671 from opening too far, and also may provide a means to remove rocking foot 652 from rail 690. To remove rocking foot 652, stopping tabs 6714 may be squeezed together until stopping surfaces 6713 are disengaged from stopping lips 696, thereby allowing rocking foot 652 to be pivoted about rocking surface 6712 and removed by approximately reversing the installation sequence described above. In some embodiments rocking surface 6712 may be a fixed pivot point or line, whereas in still other embodiments rocking surface 6712 may be a curved surface of one, multiple or varying radius (radii) that allows rocking foot 652 to essentially rock, as by rolling along rocking surface 6712, as rocking foot 652 is rotated from an insertion angle to a final angle.

Referring again now to FIG. 6, it is further illustrated how forces may act on foot 670 in a windy environment. As air flows over a PV module, such as PV module 102, a generally upward force normal to the surface of PV module 102, as shown by an arrow and designated force F, may be generated and transferred at least partially to foot 670 through bearing surface 128. Thus force A at bearing surface 128, as shown, approximately represents the portion of force F that is presented to foot 670. Force A results in a moment about a pivoting portion of foot 670, as noted at point Pin rocking surface 6712. As clip 671 may be engaged with stopping lips 696 on rail 690 (such as shown in FIG. 10), an opposing force, as shown by arrow and designated force C, is exerted by rail 690 on clip 671. One skilled in the art will recognize that the magnitude of force C is approximately proportional to force A by the ratio of the distances D1 and D2 between the pivot point P and the point(s) at which each of the forces is applied (assuming for this diagram that the angle of force A relative to vertical may be relatively small and does not significantly alter the outcome of this analysis). Since force A is (as shown) applied at bearing surface 128, and the distance D1 from where force A is applied to point P is very small compared to distance D2, for example 10 times more than the distance D 1, then the magnitude of force C may be much smaller than force A, for example approximately 10 times less than force A. The capability of tilt foot 650 to significantly reduce the force required at the clip 671, even when PV module 102 is presented with a wind load provides significant benefits including: a reduction in material size, thickness, and/or strength for clip 671 (thereby reducing cost for tilt foot 650 compared to prior known systems); possible elimination of the need for a tool to connect tilt foot 650 to rail 690 since such a clip is small and flexible enough to allow hand or foot actuation of the rocking action described above; and simplification of installation process since foot 670 may operate as a lever arm with significant mechanical advantage to drive deforming edge 676 into solid engagement with lips 696, additionally permitting a ground bond at the deformation area.

Figure 11:
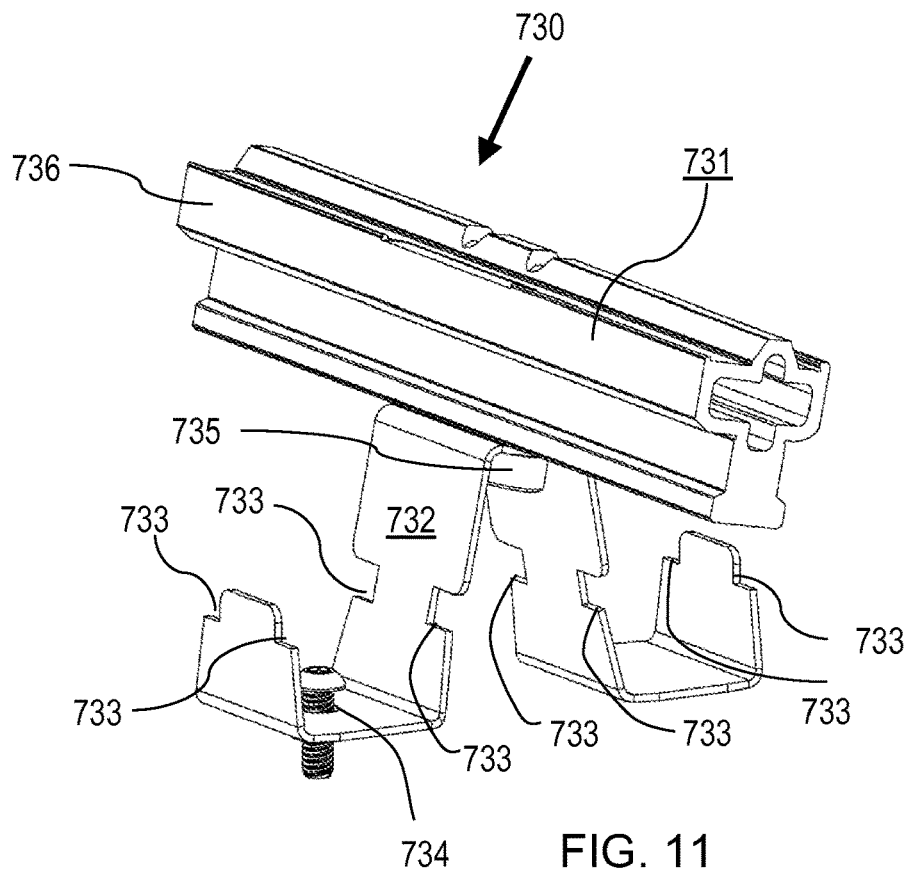
FIG. 11 is a perspective view of a squeeze-and-slide support coupling.
Figure 12:
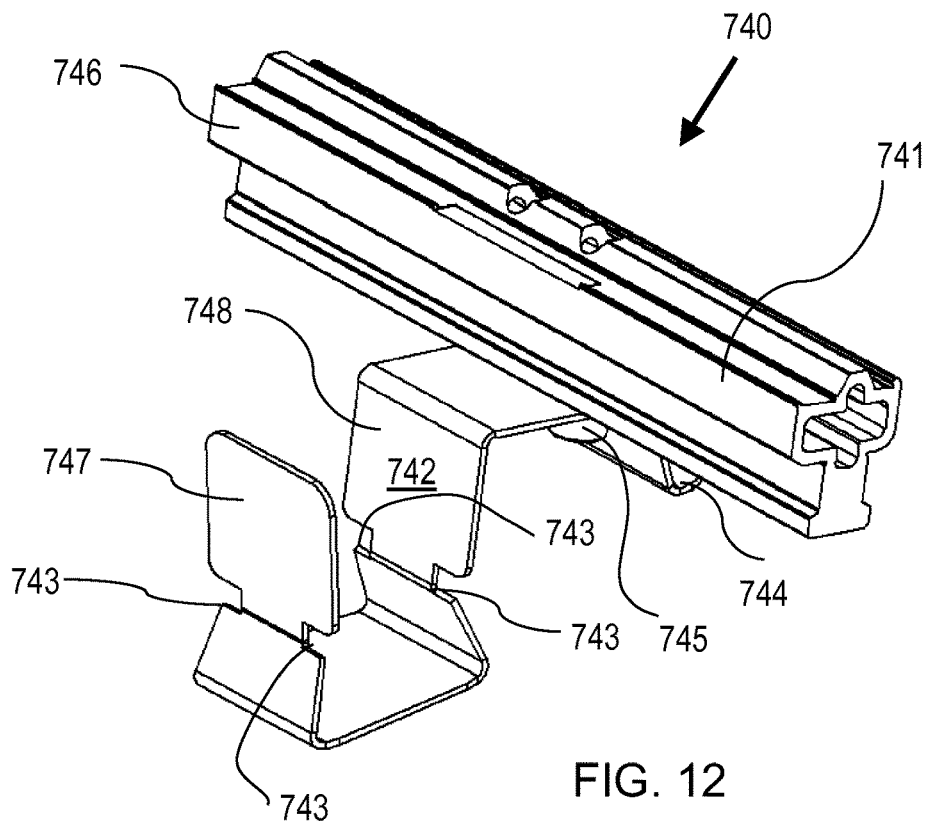
FIG. 12 is a perspective view of a slide-in support coupling.

It is recognized that brackets, mounting feet, or legs, such as tilt foot 650, may be configured in a variety of ways, but generally containing a lower portion for engaging a substructure, such as rail 690, a rail, a beam, a girder, a rafter, a ballast pan or tray, a roof seam, or a surface such as a substantially flat structural system or a tilted one as shown in FIG. 1, and an upper portion for engaging a PV module such as PV module 102, also as shown in FIG. 1. FIG. 12 shows an alternative embodiment of a bracket, or leg, such as slide-in foot 740. Slide-in foot 740 is similar to tilt foot 650 except that it connects to a structural system as by or via a squeeze-and-slide action rather than a rocking action as with tilt foot 650. Slide-in foot 740 includes a lower portion, foot base 742, for engaging a rail or channel such as rail 690, and an upper portion, interlock 741, for engaging a groove in a PV module, such as groove 114. Interlock 741 is attached to foot base 742 with one or more rivets, pins screws, welds or the like, such as screws 745 (only one shown for clarity). Foot base 742 may include multiple edges, or stopping surfaces, such as stopping surfaces 743. Interlock 741 may include a protruding section, or tongue, such as tongue 746. Tongue 746 may engage groove 114 in a manner similar to tongue 148 as shown in FIG. 11. Interlock 741 may have a length appropriate for engaging one or more PV modules so as to link them together. Slide-in foot 740 may be inserted into rail 690 by squeezing legs 747 and 748 so that stopping surfaces may slide freely between stopping lips 696 and support surfaces 695. Release of legs 747 and 748 may then drive one or more stopping surfaces 743 into stopping lips 696 to connect slide-in foot 740 to substantially any desired location along the length of rail 690.

Figure 14:
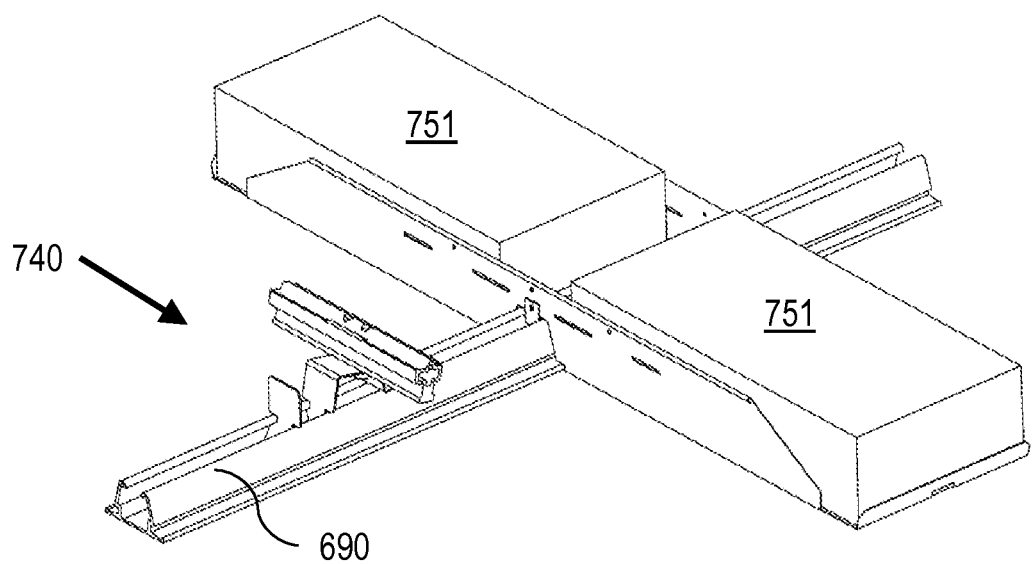
FIG. 14 is a perspective view illustrating how a support coupling and ballast pan engage with a rail.

FIG. 11 shows a further embodiment of a mounting foot, bracket or leg, similar to slide-in foot 740 described previously, such as slide-in foot 730. As shown in FIG. 14, slide-in foot 730 is adapted to slide into rail 690 without requiring a squeezing or pinching action as with slide-in foot 740. Rather, slide-in foot 730 is slid into rail 690 to the desired location along the length of rail 690, then a bolt, screw, or other threaded fastening mechanism (as shown) may be inserted or threaded through hole 734 to drive stopping surfaces 733 into stopping lips 696 and secure slide-in foot 730 to rail 690. Slide-in foot 730 may comprise an interlock 731 similar to interlock 741. Slide-in foot 730 may provide a stronger or lower cost alternative to slide-in foot 740. A combination of the two forms of slide-in foot (730 and 740) may also be used, as well as other methods and apparatus which will occur to one of skill in the art.

FIG. 15 shows another embodiment of a mounting foot, bracket or leg, similar to tilt foot 650, such as tilt foot 770. Tilt foot 770 may be comprised of an upper portion, interlock 771, similar to interlock 741, for engaging a groove in a PV module, such as groove 114. Tilt foot 770 may be further comprised of a bottom portion, such as foot base 772, which may be similar in form and function to rocking foot 652 noted and described above, but with the functions of foot 670 and clip 671 combined into one piece of material. In the embodiment shown in FIG. 15, foot base 772 includes tabs, or flanges, such as tabs 773, which are bent at such an angle as to create sharp corners, or cutting edges, such as cutting edges 774. Cutting edges 774 may perform the same or similar function as deforming edges 676 on foot 650. Foot base 772 further may include a set of bent flanges, or tabs, such as flanges 775. As foot base 772 may be made of a resilient or spring material (steel, aluminum, plastic, or the like), flanges 775 may perform the same function as clip 671.

Figure 18:
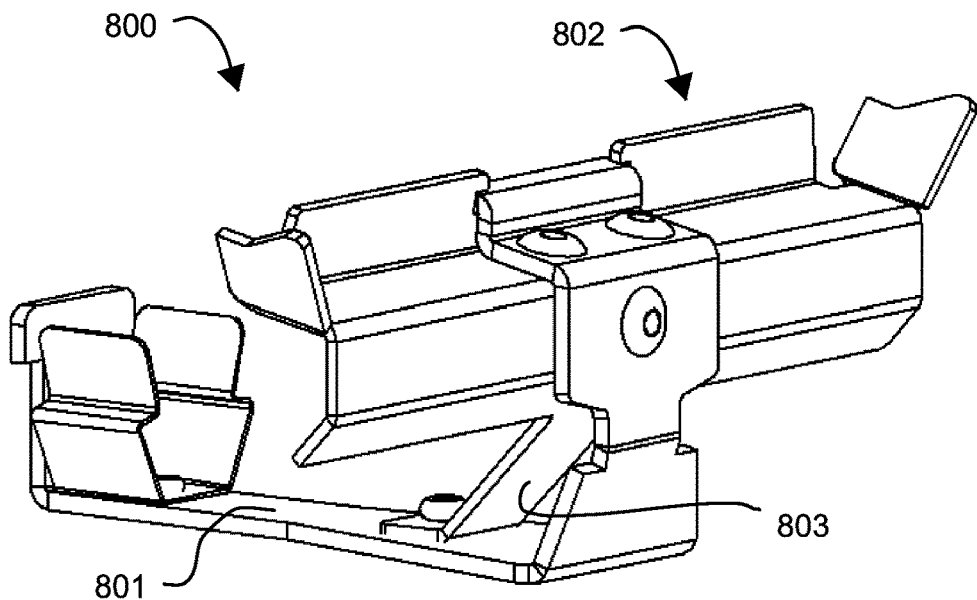
FIG. 18 is a perspective view of a support coupling according to an embodiment of the present technology.

FIG. 18 shows a further embodiment of a mounting foot, bracket or leg, similar to tilt foot 650 described previously, such as tilt foot 800. Tilt foot 800 may be comprised of a bottom portion, foot base 801, for engaging a structural system, such as rail 690 described previously, especially regarding FIGS. 7-10. Tilt foot 800 may further include an upper portion, interlock 802, similar to interlock 651 described previously, except interlock 802 is shown as including a flange, gusset, or tab, such as gusset 803, which may be formed in or on, or attached to foot base 801 as by one or more rivets (as shown), pins, screws, welds or the like, so as to increase the carrying capacity of tilt foot 800. One skilled in the art will recognize many other means, articles or features by which the carrying capacity of tilt foot 800 may be increased, such as, for example, using stronger materials, using thicker materials, or adding formed ribs, gussets, or the like; all of which are hereby expressly contemplated.

Figure 19:
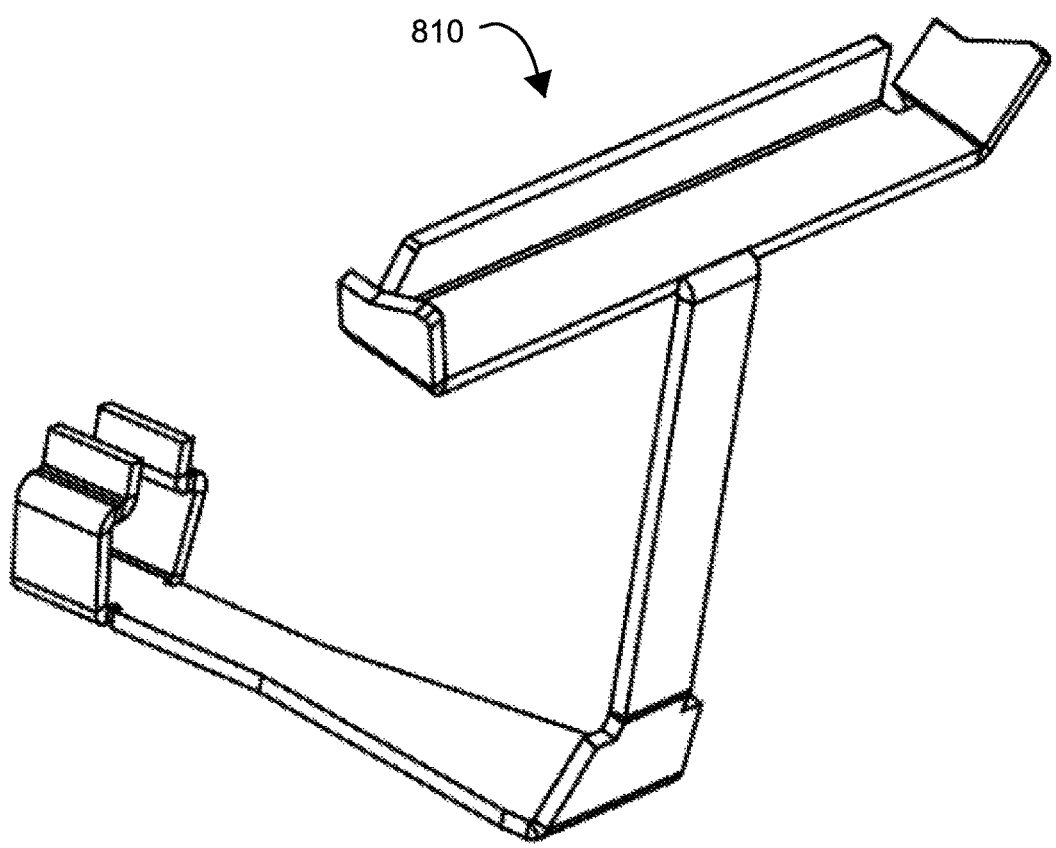
FIG. 19 is a perspective view of a support coupling according to an embodiment of the present technology.

FIG. 19 shows a further embodiment of a mounting foot, bracket or leg, similar to tilt foot 650 described previously, such as tilt foot 810. Tilt foot 810 is similar to tilt foot 650 except that it is made from a single piece of initial or raw material, thereby reducing manufacturing cost.

Figure 20:
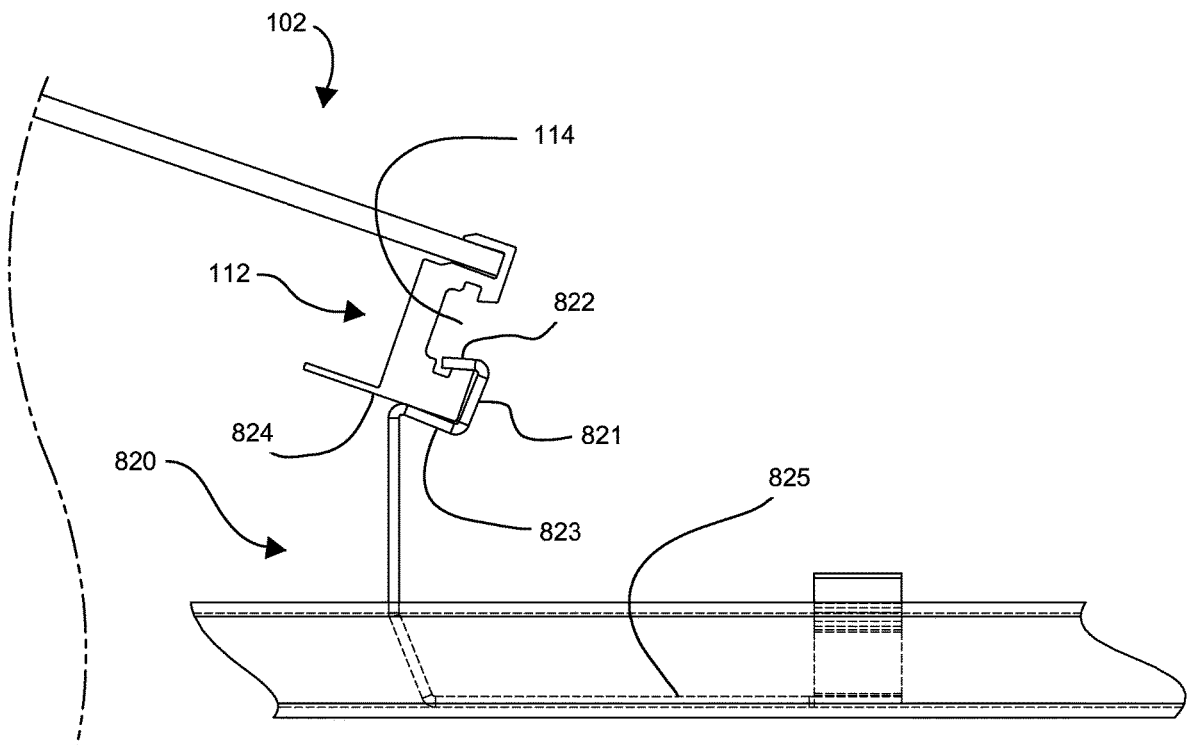
FIG. 20 is a side view of a support coupling according to an embodiment of the present technology.

FIG. 20 shows a further embodiment of a mounting foot, bracket or leg, similar to tilt foot 650 described previously, such as tilt foot 820. Tilt foot 820 is similar to tilt foot 650 except it provides an alternative means to engage groove 114 in a PV module frame. Instead engaging primarily via or by insertion into groove 114, tilt foot 820 may comprise an engaging portion 821 with an upper engaging portion 822 and a lower engaging portion 823. Tilt foot 820 may be connected to PV module 102 via or by at least partial insertion of upper engaging portion 822 into groove 114 and contact between lower engaging portion 823 and a bottom surface 824 of PV module 102. In some embodiments upper engaging portion 822 and lower engaging portion 823 function as offset bearing points as previously shown in FIGS. 30A and 39. Tilt foot may further comprise foot 825 which functions in a manner similar to foot 670 as described above. Tilt foot 820 may also have one or more ballasts or weights placed on it as shown, to hold the tilt foot 820 in place, as more fully described elsewhere, such as in regards to FIG. 13.

Figure 21:
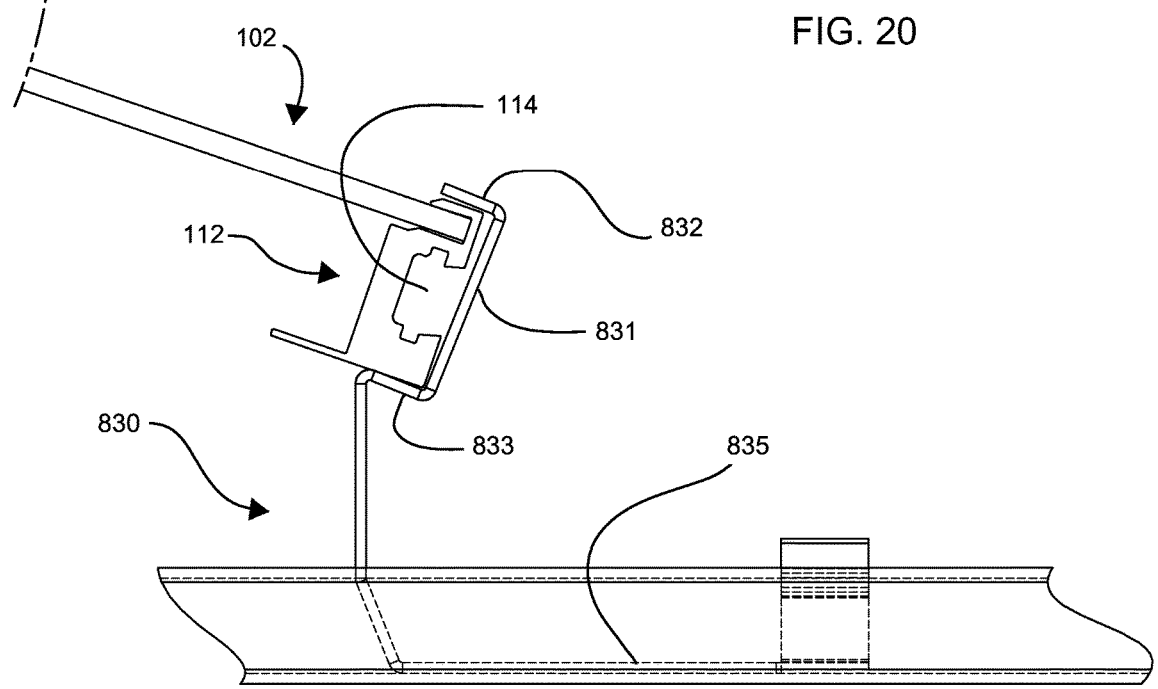
FIG. 21 is a side view of a support coupling according to an embodiment of the present technology.

FIG. 21 shows a further embodiment of a mounting foot, bracket or leg, similar to tilt foot 650 described previously, such as tilt foot 830. Tilt foot 830 is similar to tilt foot 650 except it provides an alternative means to engage a PV module frame. Instead of engaging primarily as by or via insertion into groove 114 (as done by tilt foot 820 in FIG. 20), tilt foot 830 may comprise a wrap-around engaging portion 831 with an upper engaging portion 832 and a lower engaging portion 833. Tilt foot 830 may be connected to PV module 102 as by or via a wrap-around pivot-fit action as described in other embodiments above, such as shown in FIG. 39 of previously incorporated U.S. patent application Ser. No. 14/504,168. In some embodiments upper engaging portion 832 and lower engaging portion 833 function as offset bearing points as previously shown in FIGS. 30A and 39 of previously incorporated U.S. patent application Ser. No. 14/504,168. Tilt foot may further comprise foot 835 which functions in a manner similar to foot 670 as described above. Tilt foot 830 may also have one or more ballasts or weights placed on it as shown, to hold the tilt foot 830 in place, as more fully described elsewhere, such as in regards to FIG. 13.

Figure 13:
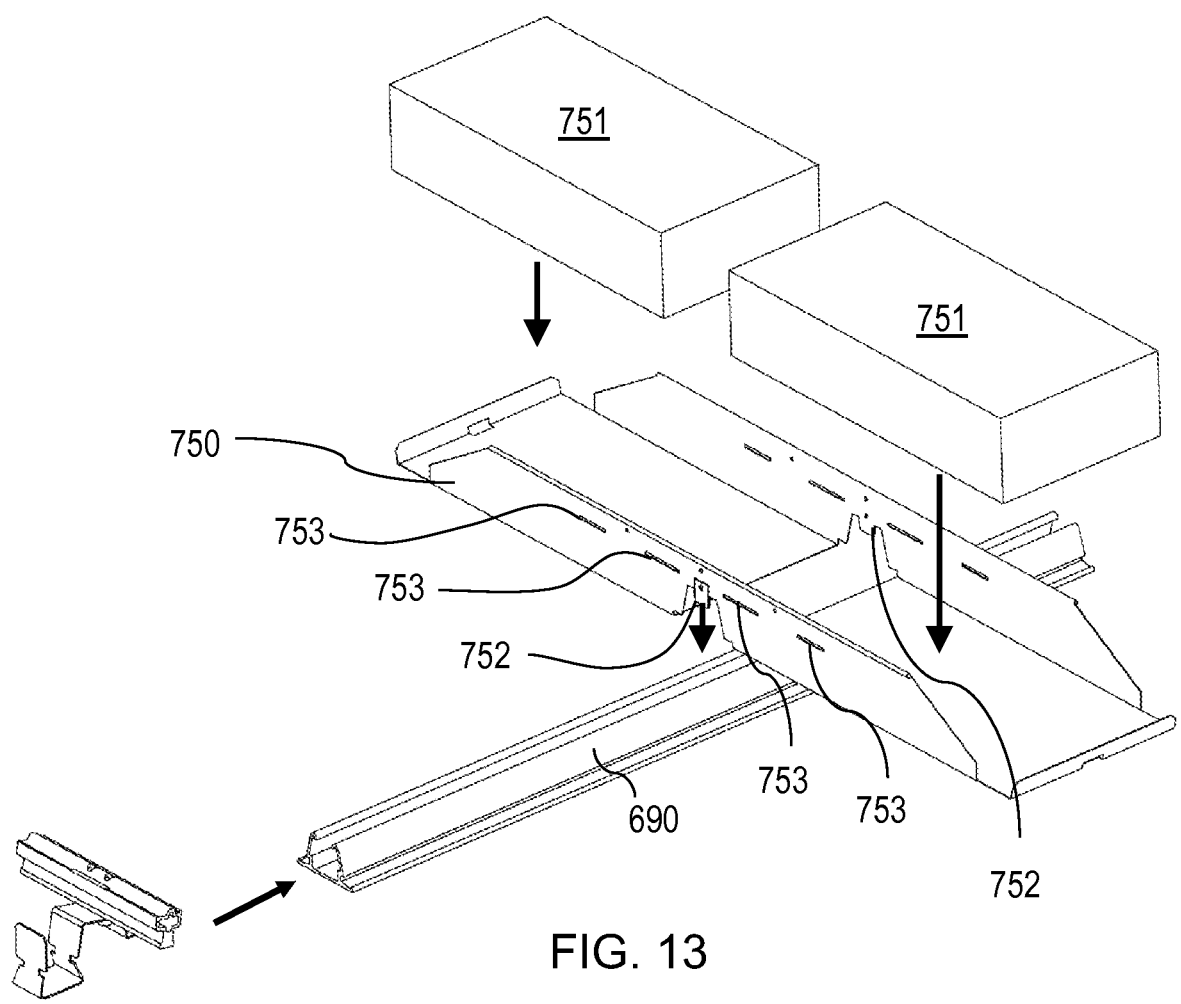
FIG. 13 is an exploded perspective view illustrating how a support coupling and ballast pan engage with a rail.

FIG. 13 shows an exploded view of slide-in foot 740 being connected to a structural system, which may comprise a rail 690, a pan, tray or container, such as ballast pan 750, and weights, stones, or blocks, such as ballast blocks 751. In some embodiments the structural system as shown in FIGS. 13-14 may further comprise a support structure, such as a roof or portions thereof (not shown in FIGS. 13-14, but generally beneath and coplanar with the bottom of rail 690). Ballast pan 750 may have one or more tabs, or flanges, such as tabs 752, which may have a width greater than the opening in rail 690 such that tabs 752 will cut rail 690. As ballast pan 750 may be made of an electrically conducting sheet metal material, such as sheet steel, the cutting action of tabs 752 into rail 690 may create an electrical bond, such as a ground bond. Ballast blocks 751 may be placed at least partially on or within/inside, ballast pan 750, thereby providing a downward holding force on rail 690 with a force approximately equivalent to the weight of ballast pan 750 and ballast blocks 751. FIG. 14 shows slide-in foot 740 and rail 690 engaged as described above. Ballast pan 750 further may contain features for engaging a diffuser support coupling and/or a diffuser, as will be described more fully below, especially in reference to FIG. 34. Said features may include one or more holes, notches, or slots, such as slots 753. In other embodiments, rail 690 is secured to a support structure, such as a roof as by or via fasteners instead of and/or in addition to ballast as is known in the art.

Figure 22:
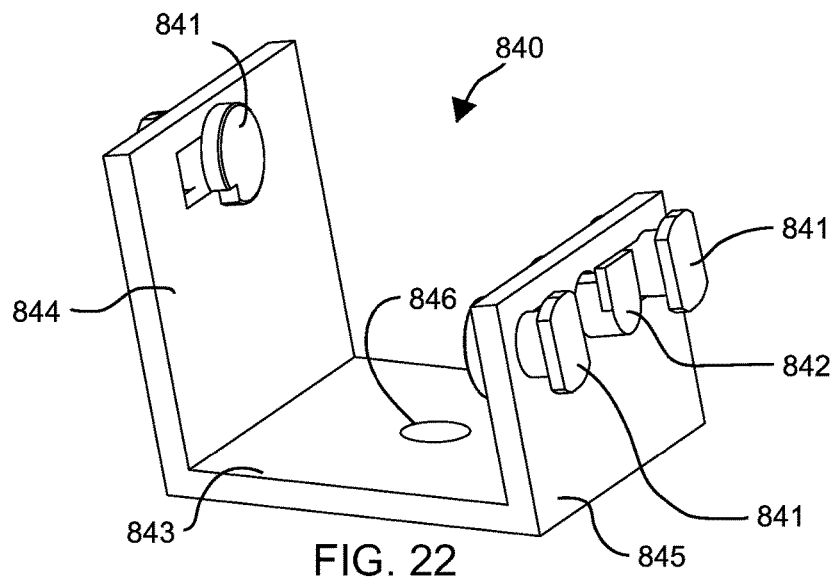
FIG. 22 is a perspective view of a support coupling according to an embodiment of the present technology.
Figure 23:
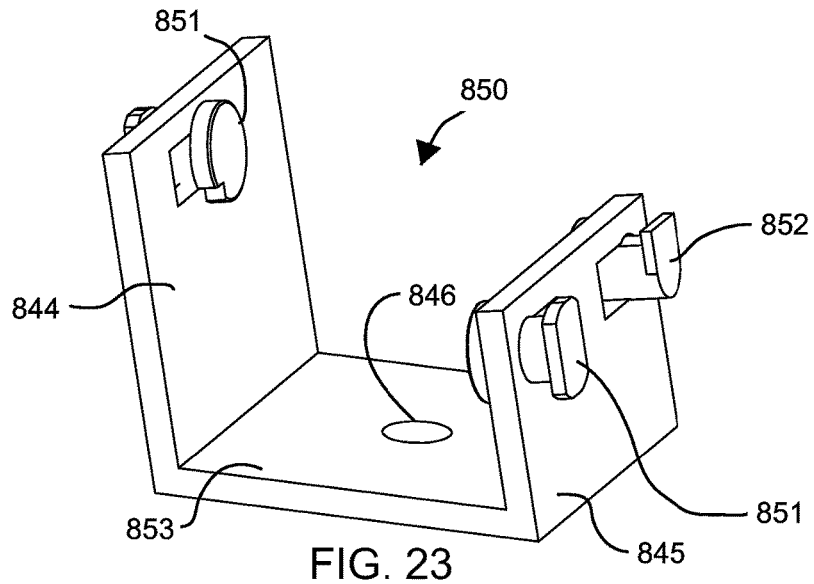
FIG. 23 is a perspective view of a support coupling according to an embodiment of the present technology.
Figure 24:
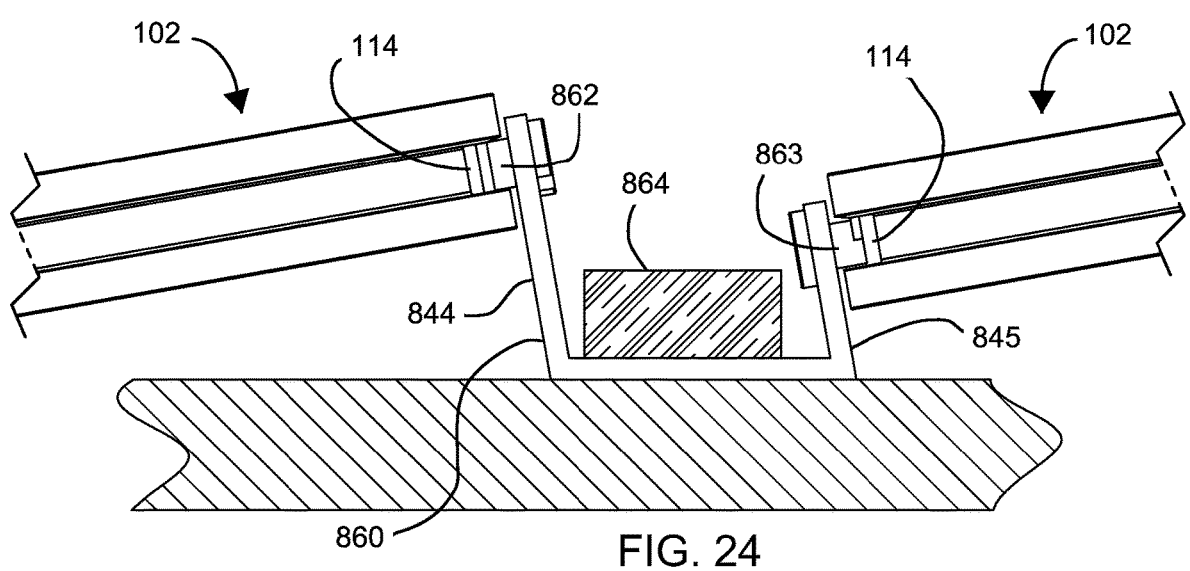
FIG. 24 is a side sectional view of a support coupling according to an embodiment of the present technology.

Additional embodiments of a tilt interlock (see, for example those shown in FIGS. 37-38 of previously incorporated U.S. patent application Ser. No. 14/504,168) are shown in FIGS. 22-24. In FIG. 22 there is shown a structural system comprising a tilt interlock such as tilt interlock 840 that may interlock together two, three, or four PV modules 102 by connecting PV modules 102 to tilt interlock 840 via couplings 841 and 842. Couplings 841 and 842 may operate similarly to couplings 290 and 294 except they may be located in different quantities and positions relative to upright 844 and upright 845. Thus one or more of couplings 841 or 842 (or other form of coupling) may be located on each of the short upright 845 and the tall upright 844 portions, of interlock 840 (or interlock 850) and in addition, zero or more of another form of coupling, such as coupling 842 or 841 may also be located on either or both upright 844, 845. Uprights 844, 845 may or may not be substantially parallel and in some embodiments may be connected to one or more of various structural systems, such as rails, beams, purlins, or directly to a support structure, such as a roof as by or via hole 846 which may contain any suitable connecting device, such as a bolt, rivet or the like, not shown. Coupling 841 may comprise a key for connection to a groove 114, as described elsewhere. Coupling 842 may comprise a tongue 848 for connection to a groove 114, also as described elsewhere. FIG. 23 shows another embodiment of a tilt interlock such as tilt interlock 850, which may be similar to tilt interlock 840 except two couplings 851, 852 are shown on the short upright 845. Coupling 851 is similar to coupling 841 and coupling 852 is similar to coupling 842 except that it is located in a different position. Again, as noted above, any combination or permutation of one or more couplings, such as 841, 842, 851 and 852 or other forms, may be located on either or both upright 844, 845.

FIG. 24 shows a side sectional view of a structural system comprising a tilt interlock such as tilt interlock 860, which may comprise a ballast stone 864 for resisting uplift loads on PV modules 102. Interlock Coupling 860 may further comprise tongue portions 862, 863 for connecting to grooves 114 in PV modules 102. Tongue portions 862, 863 may provide pivot-fit connections, similar to those described above and in previously incorporated U.S. patent application Ser. No. 14/504,168, to PV modules 102.

Figure 25:
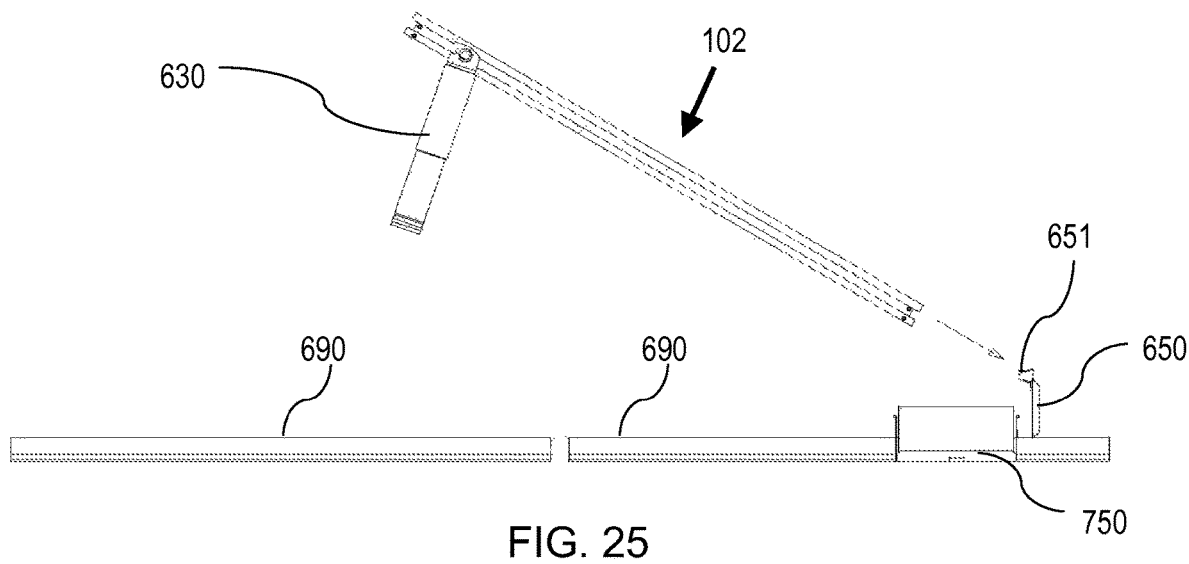
FIG. 25 is a side view showing a PV module with pivot leg approaching a support coupling mounted to a rail.
Figure 26:
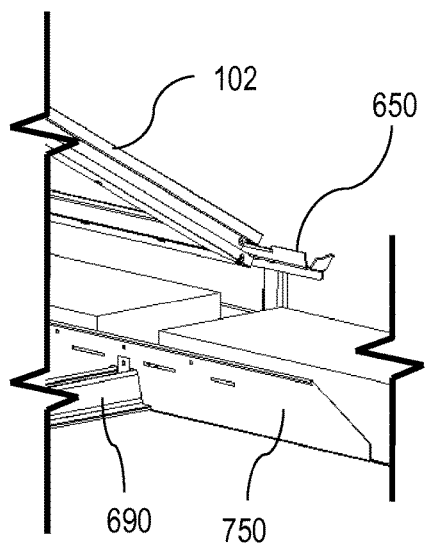
FIG. 26 is a perspective view of a PV module engaged at an insertion angle with a support coupling mounted to a rail.
Figure 27:
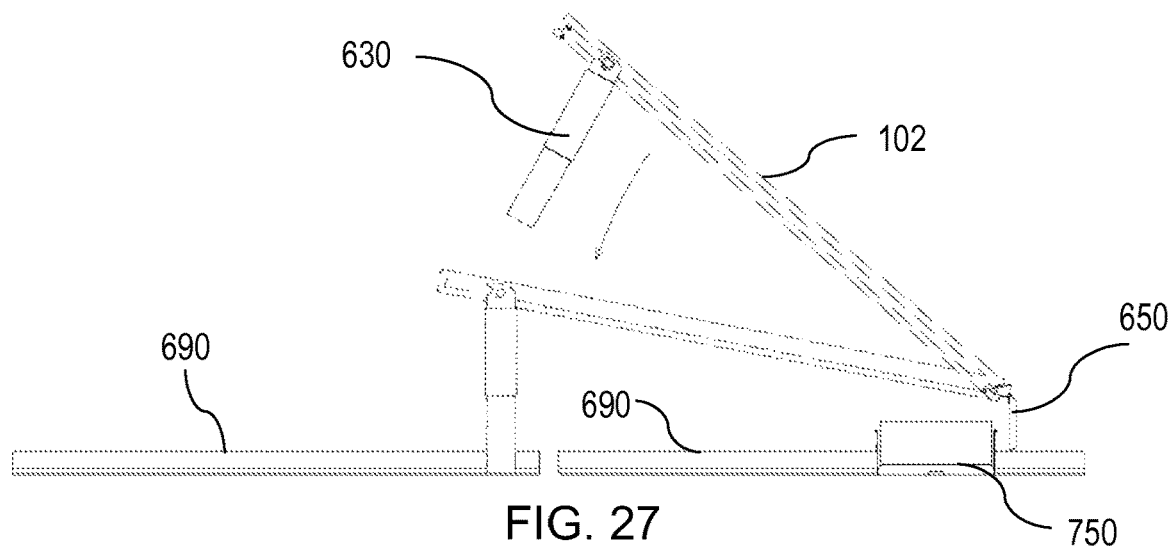
FIG. 27 is a side view illustrating the rotating motion and various positions of a PV module to complete engagement with a support coupling, and engaging a pivot leg with another rail.
Figure 27A:
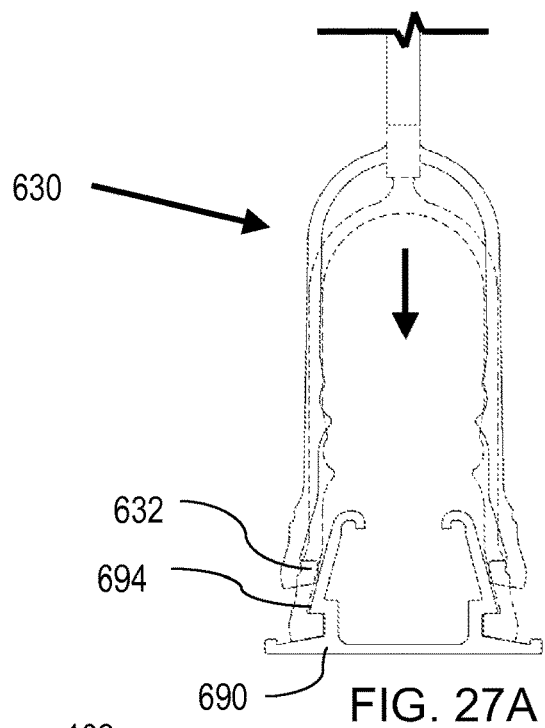
FIG. 27A is an end view of a support coupling, similar to the coupling leg shown in FIG. 1, connecting to a rail, similar to the rail shown in FIG. 7.
Figure 28:
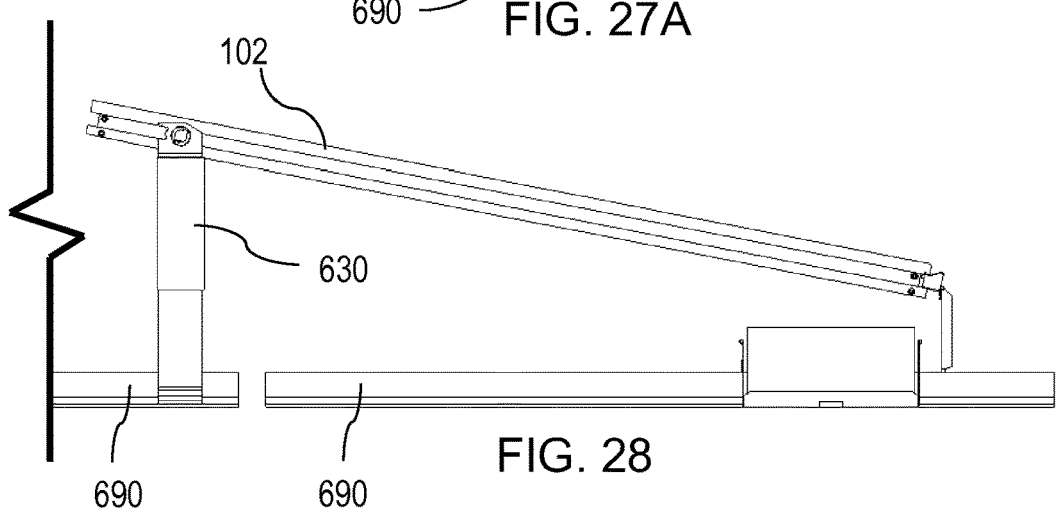
FIG. 28 is a side view of a PV module mounted to both a support coupling and pivot leg.
Figure 29:
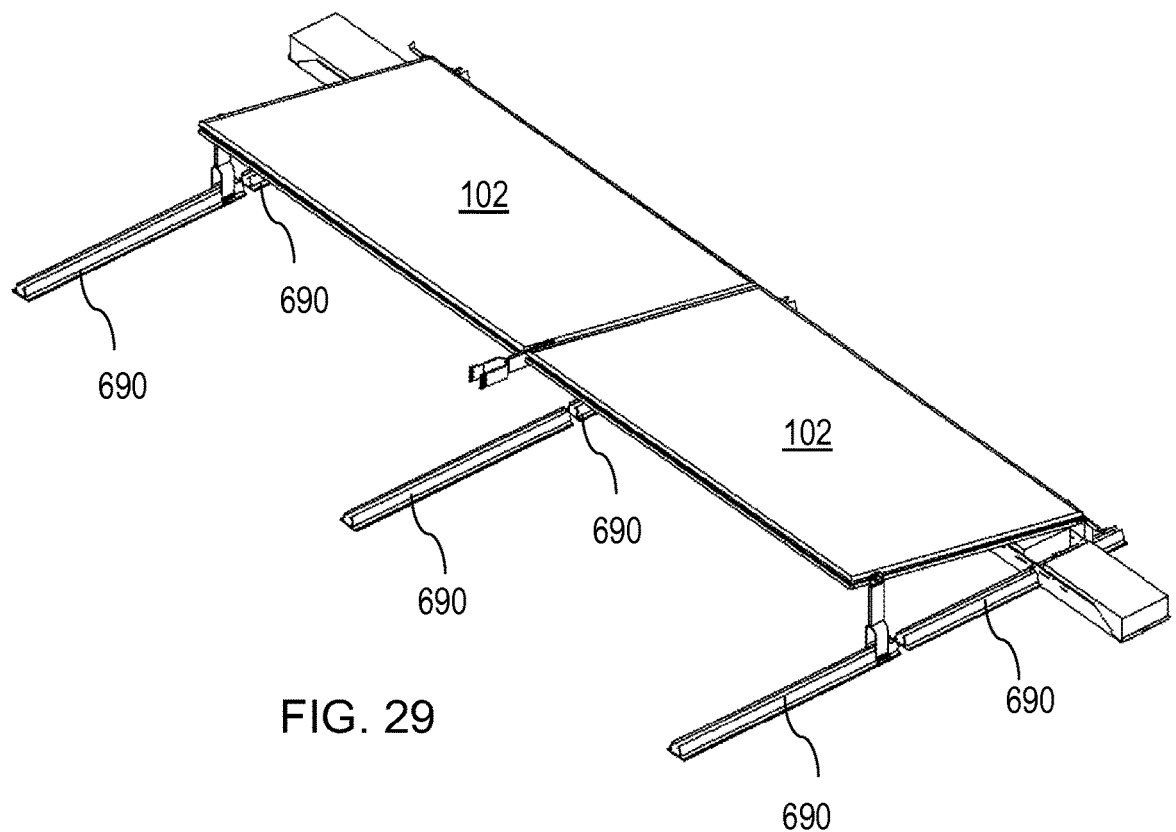
FIG. 29 is a perspective view of two PV modules at a final tilt angle with a pivot leg inserted between the modules.
Figure 30:
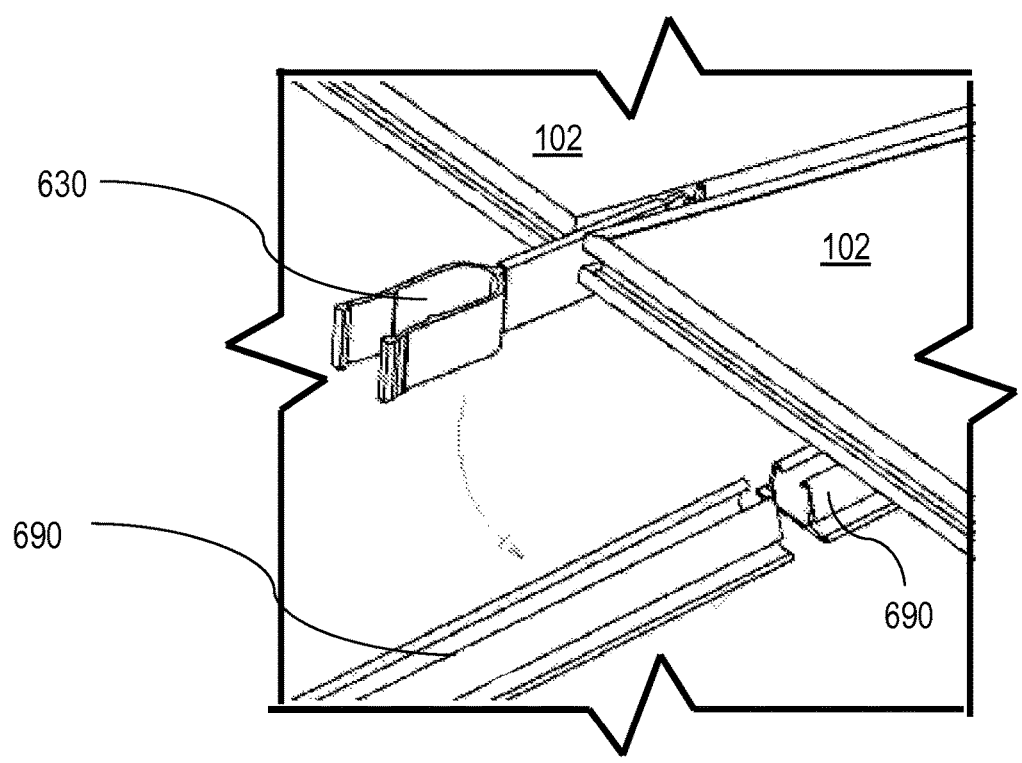
FIG. 30 is an orthogonal close-up view showing a pivot leg inserted between two modules.

FIGS. 25-30 show some of the assembly steps required to construct an array of tilted PV modules on a flat surface with a structural system as described in the embodiments of FIGS. 25-30, and as similarly described for FIGS. 37-50 of previously incorporated U.S. patent application Ser. No. 14/504,168. Coupling leg 630 may be adapted to rotationally engage a groove in the frame of a PV module, such as PV module 102, as previously described, especially in reference to FIGS. 44-48 of previously incorporated U.S. patent application Ser. No. 14/504,168. In this embodiment coupling leg 630 is adapted to slide into PV module groove 114 when held at an angle of approximately 11° (usually between 3 and 30 degrees) relative to a plane of a PV module 102. Coupling leg 630 may then be rotated approximately 90° (usually between 75 to 105 degrees) to connect coupling leg 630 to PV module 102. FIG. 25 shows a side view of a first PV module 102 in a given row being held at an insertion angle, as described above, with coupling leg 630 engaged as described above. Tilt foot 650 is shown in FIG. 25 having been slid into rail 690 and locked into position as previously described. Ballast pan 750 is also shown engaged with rail 690 as previously described in FIG. 13. PV module 102 may be tilted to an insertion angle to at least partially engage interlock 651 on tilt foot 650 with groove 114 as described above. FIGS. 26-27 show PV module 102 after it has been at least partially engaged with interlock 651 as described above. PV module 102 may now be pivoted on interlock 651 and rotated downward until coupling leg 630 engages with rail 690, as shown in FIG. 27 and interlock 651 pivotally engages offset bearing portions 124, 128 of frame 112. FIG. 28 shows a final position of coupling leg 630 with respect to PV module 102. FIG. 29 shows a second PV module 102 in a position substantially coplanar with first PV module 102, aligned such that a second coupling leg 630 may be inserted between the two PV module edges, with coupling 444 oriented such that key 448 may be engaged in a groove of one PV module, and tongue 446 may be engaged in a groove of the other PV module, thereby coupling two PV modules 102 together. FIG. 30 shows how coupling leg 630 may be then rotated to a position as previously shown in FIG. 27, and subsequently engaged with rail 690, as previously shown in FIG. 28. As coupling leg 630 may be constructed of electrically conductive materials, and coupling 444 may electrically bond to PV module 102, as described above, it will be apparent to one skilled in the art that PV module 102 may be electrically connected to rail 690 through coupling 444 and coupling leg 630. Though interlock 651 is mostly obscured by modules 102 in FIG. 29, one of skill in the art will recognize that a first angled flange 661 on interlock 651 engages a first PV module 102 as shown in FIG. 26 and a second angled flange 661 on interlock 651 engages a second PV module 102 as generally shown in FIG. 29.

Figure 31:
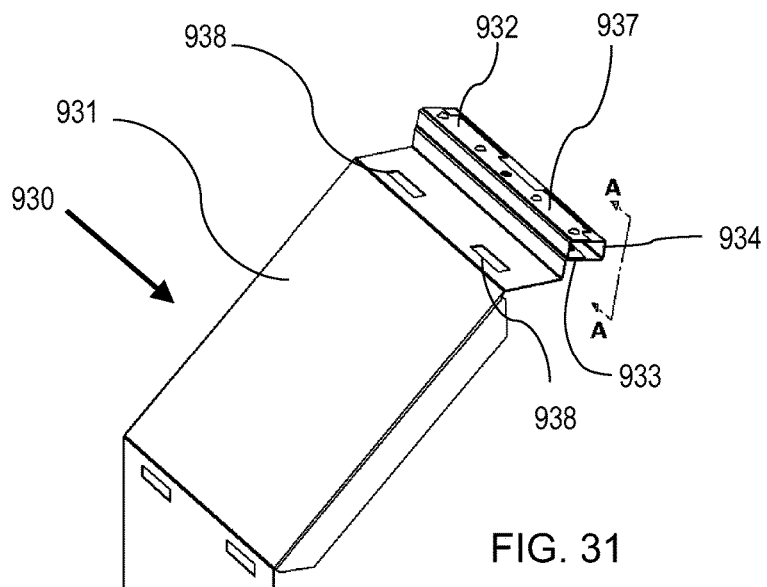
FIG. 31 is a perspective view of a diffuser support coupling.
Figure 32:
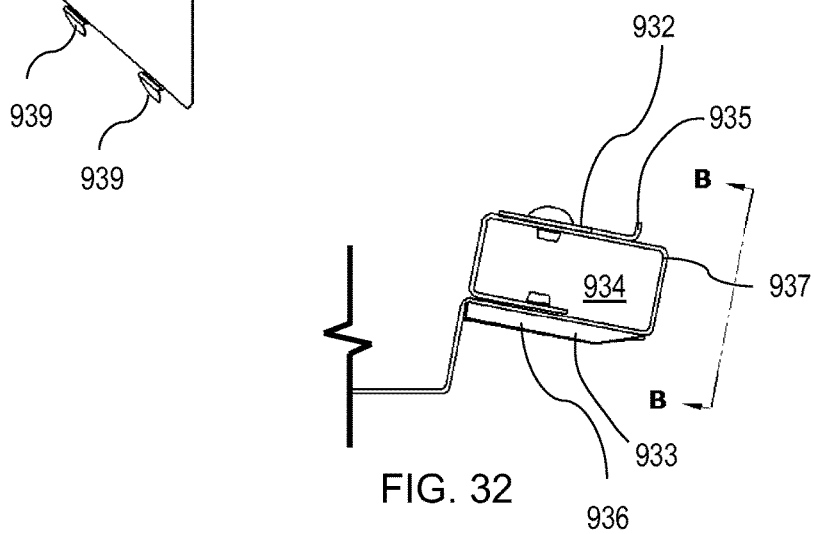
FIG. 32 is an enlarged side view of a portion of a diffuser support coupling, viewed along line A-A of FIG. 31.
Figure 33:
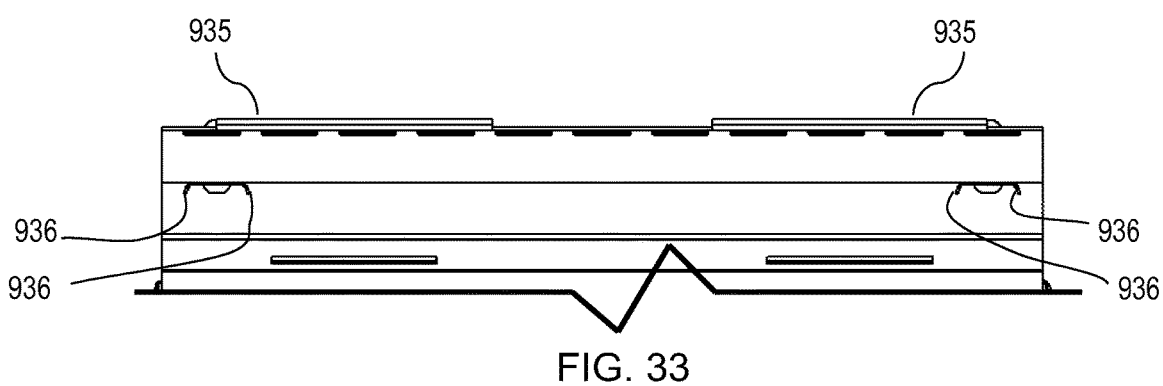
FIG. 33 is a front view of a diffuser support coupling, viewed along line B-B of FIG. 32.

FIGS. 31-33 present a further embodiment of an interlock, ballast pan connector with an integral interlock, or a coupling, such as diffuser support coupling 930. Diffuser support coupling 930 may comprise of a bent bracket, or plate, such as diffuser support bracket 931, formed from a rigid material such as steel, to create a rectangular section, or bracket, such as box section 934. A bracket, or plate, such as catch plate 932 may be affixed to the top of box section 934 as by one or more rivets, pins screws, welds or the like. Catch plate 932 may have a bent flange, or lip, such as catch 935. One or more clips, or brackets, such as ground clips 933 may be affixed to the bottom of box section 934 as by one or more rivets, pins, screws, welds or the like. Ground clip 933 may be formed of spring steel or the like with two flanges angled downward as to create cutting edges 936, in a manner similar to cutting edges 663 on interlock 651 in FIG. 4. Box section 934, coupled with catch plate 932 and ground clips 933, form interlock 937, which may engage with a groove in a PV module, such as groove 114 in PV module 102, via a pivot-fit action similar to tongue 746 in FIG. 12 and other interlocks and/or tongues as described above and in previously incorporated U.S. patent application Ser. No. 14/504,168. As box section 934, catch plate 932, and ground clips 933 may be made of plate steel and permanently connected as by one or more rivets, screws, pins, welds or the like, the components may thereby electrically connected, which may form a ground connection. When interlock 937 is inserted and engaged with groove 114, cutting edges 936 may deform or cut into bearing surface 128, thereby creating electrical contact between PV module 102 and diffuser support coupling 930. Diffuser support bracket 931 also may contain features for engaging with a wind diffuser, as will be shown below, especially in reference to FIG. 36, and for engaging with a ballast pan, such as ballast pan 750, as will be described in more detail below, especially in reference to FIG. 34. Said features may include one or more holes, slot, or notches, such as slots 938, and/or one or more hook-shaped flanges, or tabs, such as hook tabs 939. In other embodiments diffuser support coupling does not comprise diffuser support bracket 931. In still other embodiments interlock 937 does not comprise the other elements shown in diffuser support coupling and thus solely operates as an interlock capable of coupling two adjacent PV modules together via a pivot-fit action.

Figure 34:
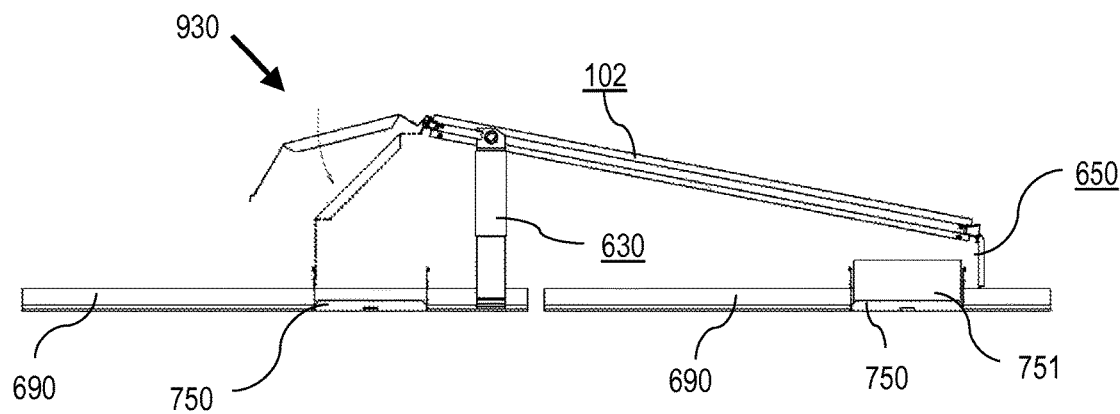
FIG. 34 is a side view illustrating engagement of a diffuser support coupling with a tilted PV module, and further engaged with a ballast pan.

FIG. 34 is a side view of a PV module mounted to a structural system and illustrating how diffuser support coupling 930 may engage with a groove in a PV module, such as groove 114 in PV module 102. First, diffuser support coupling 930 may be inserted into groove 114 of PV module 102 at an angle similar to an insertion angle. Diffuser support coupling 930 may then be rotated down so that catch plate 932 contacts bearing surface 124, and cutting edges 936 contact bearing surface 128. Next, ballast pan 750 may be positioned underneath diffuser support coupling 930 so that hook tabs 939 may be inserted into slots 753. Tabs 752 on ballast pan 750 may then be pushed into rail 690, cutting into rail 690 to create electrical contact. As ballast pan 750 and diffuser support coupling 930 may be made of electrically conductive materials, an electrical connection, such as a grounding path, is made from PV module 102, through diffuser support coupling 930 (as described above), through ballast pan 750, and through rail 690.

Figure 35:
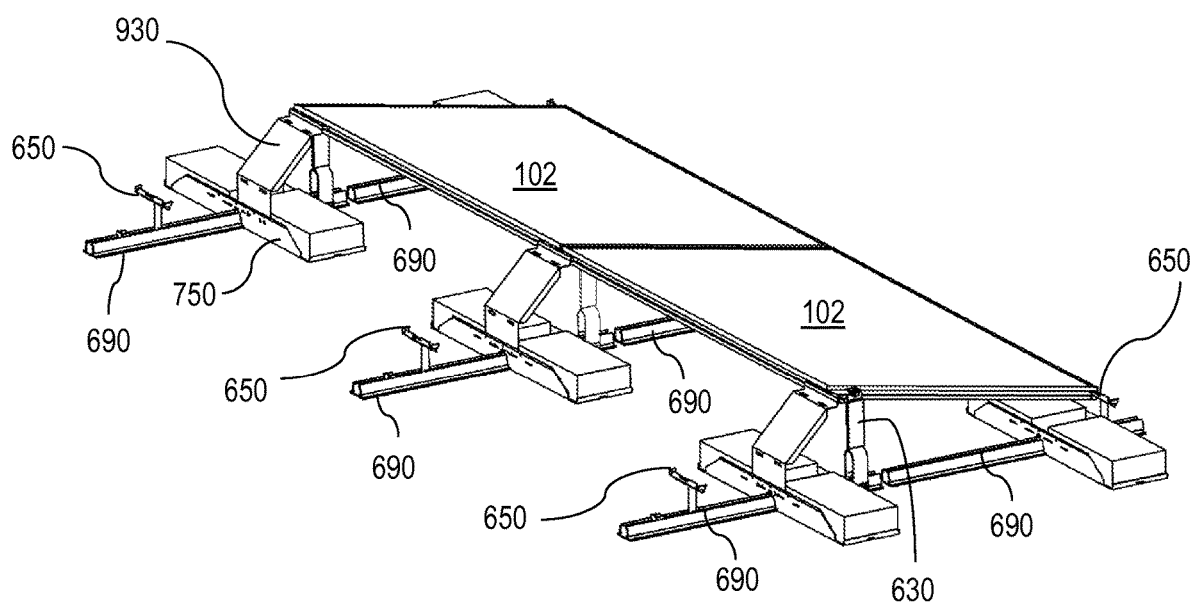
FIG. 35 is a perspective view of an array of two PV modules mounted to three support couplings, three pivot legs, and three diffuser support couplings each with a ballast pan.

FIG. 35 shows a two-module PV array, comprising PV modules 102, with an additional three tilt feet 650 connected to rail s 690. One skilled in the art will recognize that a second row of PV modules 102 may be installed in a similar manner to the row shown in FIG. 35 by repeating the steps described above to connect PV modules 102 to rail s 690 with tilt feet 650 and coupling legs 630. In some embodiments rail s 690 may primarily run between rows with the first and last rail s being pushed up under PV modules 102 to prevent them from sticking out too far, as is shown with the right-most rail s 690 in FIG. 35 being pushed under PV modules 102. In other embodiments rail s 690 may be cut longer to connect multiple rows together. One skilled in the art may appreciate that PV module 102 may be electrically connected to rail s 690 through tilt foot 650, coupling leg 630, and the series of components which include diffuser support coupling 930, and ballast pan 750. Thus, as shown in FIG. 35, when additional tilt feet 650 may be installed in rail s 690, an electrical connection between rows of PV modules 102 may also be established. Furthermore, it has been shown above that an electrical connection may be established between PV modules 102 within a row through cutting edges 663 on interlock 651, coupling 444 on coupling leg 630, and cutting edges 936 on ground clips 933.

Figure 36:
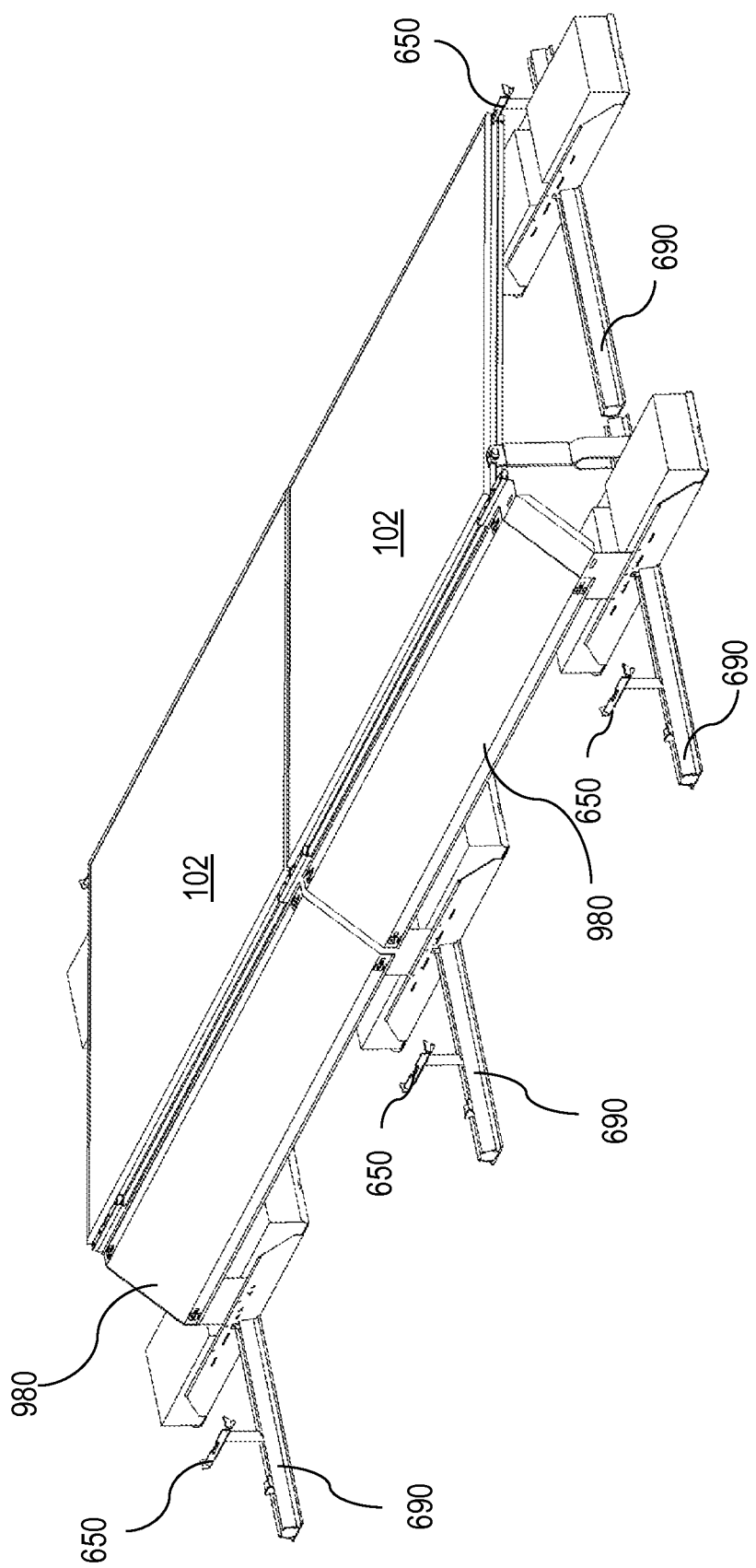
FIG. 36 is a perspective view of wind diffusers mounted to the array of FIG. 35.

One skilled in the art will also understand the benefits afforded by the addition of a wind deflector, shield, or wind diffuser, such as wind diffusers 980 as shown in FIG. 36. Said benefits include a significant reduction in the upward force generated by air flowing from behind and underneath the array of PV modules. Wind diffusers 980 may direct the flow of air over the PV modules, thereby reducing the upward force, which allows the use of fewer ballast blocks and potentially permits the use of less robust and expensive structural members for supporting and mounting the PV array. Wind diffusers 980 may be made of bent sheet or formed material (such as metal, plastic, concrete, or the like) in a generally rectangular shape. Wind diffusers 980 may be mounted to the PV array by resting on and engaging with diffuser support coupling 930. Wind diffuser 980 may be attached to diffuser support coupling 930 as by one or more pins, clips, rivets, screws, welds, or the like, which are not shown. In other embodiments wind diffuser 980 may be connected to a PV module groove 114 and to a structural system, such as rail 690, and/or directly to a support structure, such as a roof, or the like.

One skilled in the art will recognize that a support system comprising a combination of tilt feet 650, rail rails 690, coupling legs 630, ballast blocks 751, and wind deflectors 980 may recur in a similar form as shown in FIG. 36 between adjacent PV modules and at the edges of rows of PV modules in a larger array of PV modules 102. And the exact number of ballast blocks may vary within a larger array of PV module 102 depending on the localized loads on specific PV modules 102 within the array. For example, in some embodiments a wind load may be higher near the edge of an array of PV modules 102, and thus more ballast blocks 751 may be located near the edges than in the middle of the array. In other embodiments ballast blocks 751 may be replaced in some or all locations within a larger array of PV modules 102 by screws, standoffs, hold-downs, or other means of mechanically connecting rail 690 to a structural system or directly to a roof or other support structure.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions, and sub-combinations as are within their true spirit and scope.

What is claimed is:

1. A system for mounting a photovoltaic module, comprising:
   a mounting rail for mounting configured to directly mount to a support structure, wherein the mounting rail includes an upward facing inner channel configured to face upwardly when directly mounted to the support structure; and
   a mounting bracket for mounting configured to mount to the inner channel of the mounting rail, the mounting bracket comprising:
   an L-shaped body having a first leg and a second leg meeting at an intersection;
   a coupling portion mounted on an end of the first leg of the L-shaped body, the coupling portion being dimensioned to connect the mounting bracket to a photovoltaic module; and
   a spring clip mounted on an end of the second leg of the L-shaped body and comprising a support surface and a pair of angled walls extending from opposite sides of the support surface, wherein the pair of angled walls is configured to initially flex inwardly from an original position while being installed within the inner channel of the mounting rail and to subsequently flex away from each other after being installed to snap into the inner channel of the mounting rail.

2. The system of claim 1, wherein opposite ends of the coupling portion are dimensioned to support front corners of two photovoltaic modules.

3. The system of claim 2, wherein the opposite ends of the coupling portion extend in a direction perpendicular to the second leg of the L-shaped body.

4. The system of claim 2, wherein the opposite ends of the coupling portion comprise cutting edges.

5. The system of claim 1, wherein a center portion of the L-shaped body comprises a rocking surface.

6. The system of claim 1, wherein the coupling portion comprises:
   (i) a support body,
   (ii) a wall extending upwardly from the support body, and
   (iii) outwardly angled flanges extending from opposite ends of the support body.

7. The system of claim 6, wherein the coupling portion is configured to support the photovoltaic module above the support structure such that a surface of a photovoltaic laminate of the photovoltaic module is disposed at a non-parallel angle
   relative to the support structure.

8. The system of claim 6, wherein the wall extending upwardly from the
   support body is configured to engage with a slot within a groove of a frame of the photovoltaic module.

9. The system of claim 6, wherein the outwardly angled flanges comprise upper and lower portions configured to engage with bearing surfaces of a groove of a frame of the photovoltaic module.

10. The system of claim 1, wherein the pair of angled walls of the spring clip comprise a first pair of angled walls, wherein the inner channel of the mounting rail is defined by a second pair of angled walls terminating in a pair of lips, and wherein the first pair of angled walls of the spring clip engage with the pair of lips so as to fix the mounting bracket to the mounting rail.

11. The system of claim 10, wherein the first leg comprises an engaging portion configured to pierce the pair of lips of the mounting rail when the mounting bracket is installed into the mounting rail so as to mechanically couple and electrically ground bond the mounting bracket to the mounting rail.

12. The system of claim 11, wherein the engaging portion comprises an angled tab with a pair of edges configured to pierce the pair of lips of the mounting rail when the mounting bracket is installed into the mounting rail.

13. The system of claim 1, wherein the mounting rail comprises a pair of essentially vertical walls defining the inner channel and a pair of essentially horizontal supporting walls extending inwardly from the vertical walls, and wherein a center portion of the mounting bracket comprises a rocking surface that engages with the horizontal supporting walls.

14. The system of claim 13, wherein the mounting bracket is configured to pivot about the rocking surface into an installed position within the mounting rail.

15. A photovoltaic array, the array comprising:
at least two mounting rails mounted to a support structure, wherein each of the mounting rails includes an upward facing inner channel;
at least two mounting brackets, each of the at least two mounting brackets mounted to the inner channel of a respective one of the at least two mounting rails, each mounting bracket comprising:
an L-shaped body having a first leg and a second leg meeting at an intersection;
a coupling portion mounted on an end of the first leg of the L-shaped body, the coupling portion comprising a support body, a wall extending upwardly from the support body that is configured to engage a slot within a groove of a frame of a photovoltaic module and outwardly angled flanges extending from opposite ends of the support body; and
a spring clip mounted on an end of the second leg of the L-shaped body, wherein the spring clip flexes inwardly from an original position while being installed within the inner channel of the mounting rail and flexes back towards the original position after being installed to snap into the inner channel of the mounting rail;
at least two coupling legs, each of the two coupling legs mounted to a respective one of the at least two mounting rails, the coupling legs each comprising an engaging portion;
at least one photovoltaic module coupled to and supported by the coupling portions of the at least two mounting brackets and the engaging portions of the at least two coupling legs.

16. The photovoltaic array of claim 15, wherein the coupling legs have a height greater than the mounting brackets so as to support the at least one photovoltaic module at a non-parallel angle with respect to the support structure.

17. The photovoltaic array of claim 15, wherein each of the outwardly angled flanges comprise upper and lower portions configured to engage with bearing surfaces of a groove of a frame of the at least one photovoltaic module.

* * * * *